(12) United States Patent
Mukhopadhyay et al.

(10) Patent No.: US 12,711,355 B2
(45) Date of Patent: Aug. 18, 2026

(54) SYSTEM AND METHOD FOR AN ADJUSTABLE NEURAL NETWORK

(71) Applicants: Supratik Mukhopadhyay, Baton Rouge, LA (US); Edward Collier, Baton Rouge, LA (US); Robert Dibiano, Baton Rouge, LA (US)

(72) Inventors: Supratik Mukhopadhyay, Baton Rouge, LA (US); Edward Collier, Baton Rouge, LA (US); Robert Dibiano, Baton Rouge, LA (US)

(73) Assignees: BOARD OF SUPERVISORS OF LOUISIANA STATE UNIVERSITY AND AGRICULTURAL AND MECHANICAL COLLEGE, Baton Rouge, LA (US); AILECTRIC, LLC, Baton Rouge, LA (US)

( * ) Notice: Subject to any disclaimer, the term of this patent is extended or adjusted under 35 U.S.C. 154(b) by 711 days.

(21) Appl. No.: 18/028,434

(22) PCT Filed: Oct. 1, 2021

(86) PCT No.: PCT/US2021/053120

§ 371 (c)(1),
(2) Date: Mar. 24, 2023

(87) PCT Pub. No.: WO2022/072796

PCT Pub. Date: Apr. 7, 2022

(65) Prior Publication Data

US 2023/0367995 A1 Nov. 16, 2023

Related U.S. Application Data

(60) Provisional application No. 63/193,482, filed on May 26, 2021, provisional application No. 63/086,329, filed on Oct. 1, 2020.

(51) Int. Cl.
*G06N 3/045* (2023.01)
*G06N 3/096* (2023.01)

(52) U.S. Cl.
CPC ............ *G06N 3/045* (2023.01); *G06N 3/096* (2023.01)

(58) Field of Classification Search
CPC ...................................................... G06N 3/045
(Continued)

(56) References Cited

U.S. PATENT DOCUMENTS 4,481,662 A 11/1984 Long et al.
9,240,955 B1 1/2016 Mukhopadhyay et al.
(Continued)

OTHER PUBLICATIONS

Diagnosing Convolutional Neural Networks using their Spectral Response, Statmatescu et al, Oct. 8, 2018 (Year: 2018).*
(Continued)

*Primary Examiner* — Austin Hicks
(74) *Attorney, Agent, or Firm* — Venable LLP; Ryan T. Ward

(57) ABSTRACT

Systems, methods, and non-transitory computer-readable storage media for an adjustable neural network. Systems measure feature applicability for an octave of a Convolutional Neural Network (CNN) at a standard scale, resulting in (1) at least one drop-off point where the octave no longer resonates with pre-defined features; and (2) a common drop-off between the CNN and at least one other CNN trained on at least one other separate domain. The system can then measure octave resonance for a plurality of CNNs trained on large data sets with a distribution of octaves for features, and measure a pattern of octaves learned in the CNN, resulting in a measurement pattern. The system can then compare that measurement pattern to the pre-defined features, resulting in a level of adaptability of the CNN, and
(Continued)

modify the CNN based on the level of adaptability of the CNN, resulting in a modified CNN.

17 Claims, 11 Drawing Sheets

(58) Field of Classification Search
USPC ........................................................ 706/21
See application file for complete search history.

(56) References Cited

U.S. PATENT DOCUMENTS

| | | | |
|---|---|---|---|
| 2007/0047802 | A1 | 3/2007 | Puri |
| 2016/0026912 | A1 | 1/2016 | Falcon et al. |
| 2017/0243084 | A1 | 8/2017 | Soatto et al. |

OTHER PUBLICATIONS

Towards Frequency-Based Explanation for Robust CNN, Wang et al, May 6, 2020 (Year: 2020).*
Network Morphism, Wei et al, Mar. 5, 2016 (Year: 2016).*
Towards Open World Recognition, Bendale et al, Dec. 18, 2014 (Year: 2014).*
Das Neves Junior et al. "A Fast Fully Octave Convolutional Neural Network for Document Image Segmentation," (Apr. 3, 2020), Retrieved on Dec. 6, 2021 (Dec. 6, 2021) from <https://arxiv.org/abs/2004.01317>.

* cited by examiner

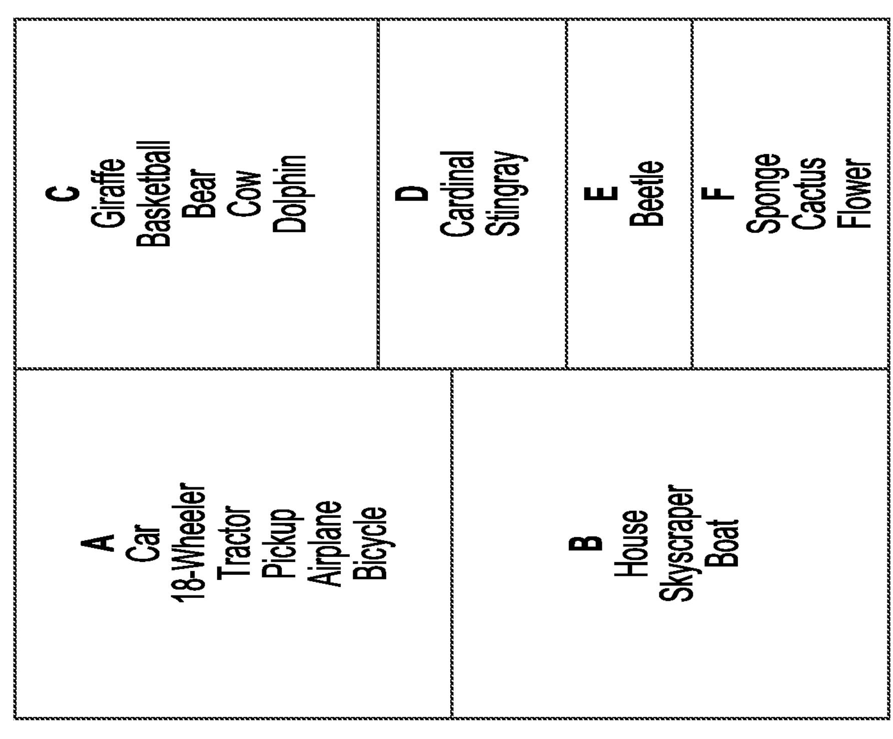
FIG. 4
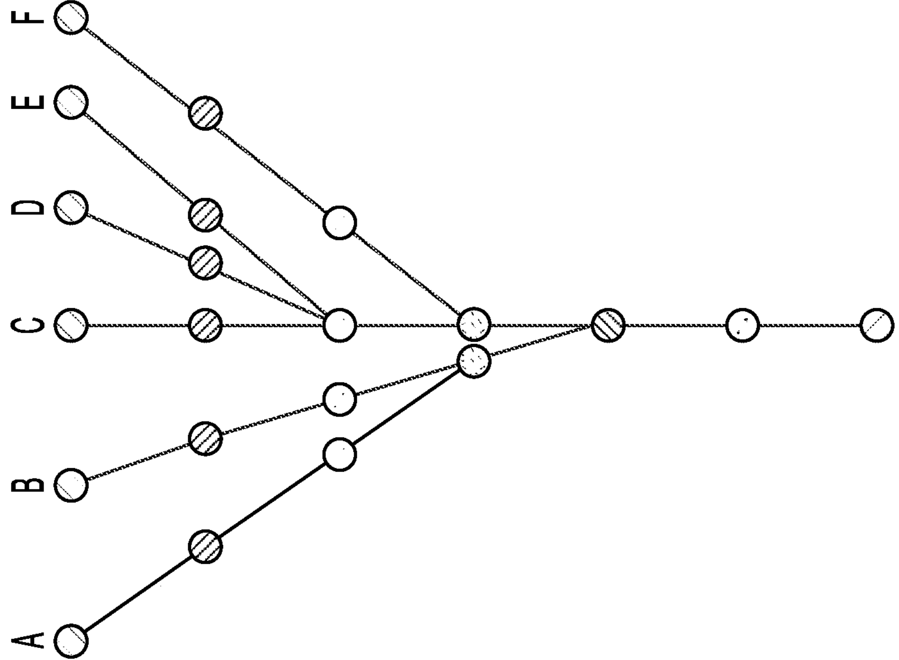

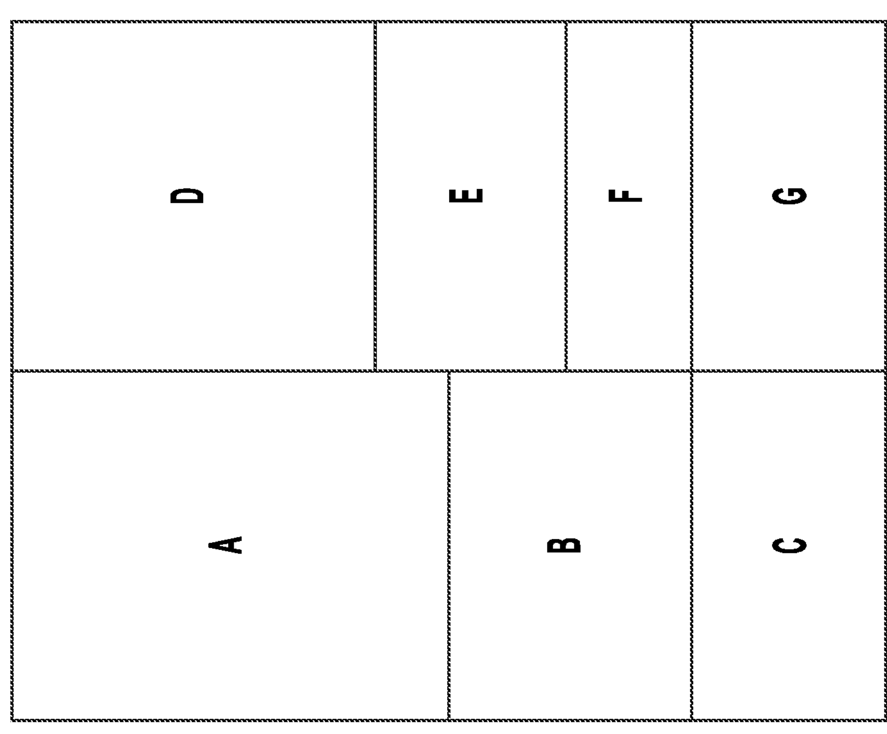
FIG. 5
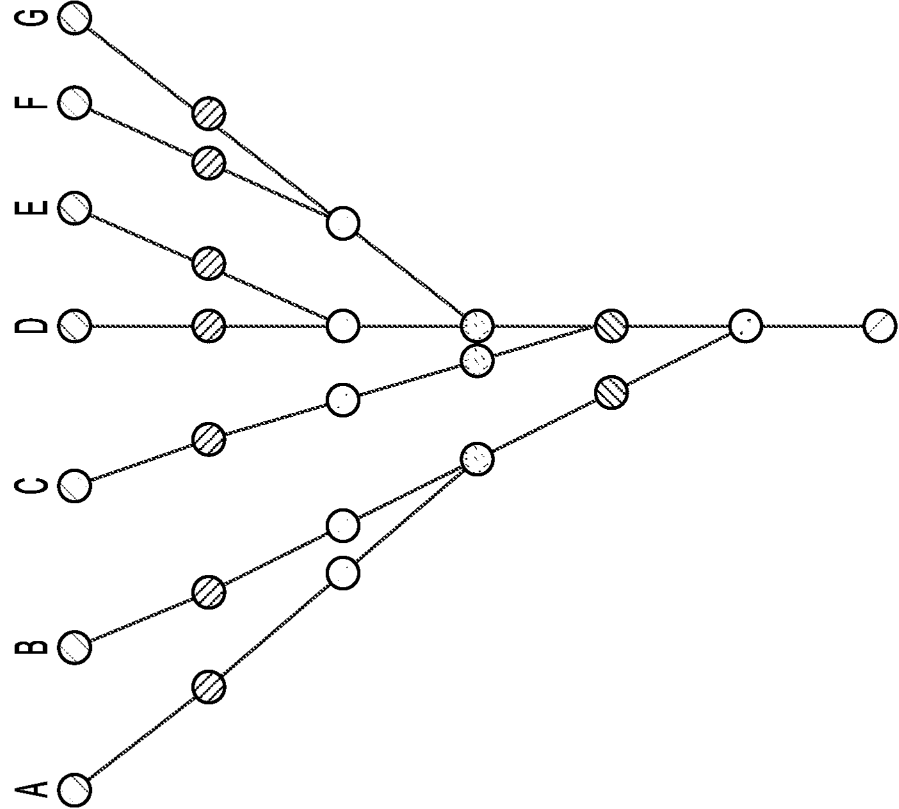

SYSTEM AND METHOD FOR AN ADJUSTABLE NEURAL NETWORK

CROSS REFERENCE

This application is a U.S. National Stage of PCT/US2021/053120, filed Oct. 1, 2021, which claims priority to U.S. provisional patent application 63/086,329, filed Oct. 1, 2020, and U.S. provisional patent application 63/193,482, filed May 26, 2021, the contents of which are incorporated herein in their entirety.

BACKGROUND

1. Technical Field

The present disclosure relates to neural networks, and more specifically to building a neural network capable of scaling.

2. Introduction

Neural networks have been improving by leaps and bounds for the last decade, most notably due to the emergence of CNN (Convolutional Neural Network), unsupervised pretraining, and better regularization methods. On many difficult image recognition tasks, neural networks are competitive with humans. Nevertheless, there is lot of room for improvement. A human can easily learn to recognize a new type of animal from just one image of the animal, or even from a crude sketch. Even if the animal is oriented differently, it can most likely be learned in one shot. The same applies to non-image data.

However, for neural networks this is not the case. Traditionally, in order for neural networks to recognize new or different objects requires ever increasing amounts of training data, resulting in slower recognition of the objects and increased use of storage devices.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include: measuring, via a processor, feature applicability for an octave of a Convolutional Neural Network (CNN) at a standard scale, resulting in (1) at least one drop-off point where the octave no longer resonates with pre-defined features; and (2) a common drop-off between the CNN and at least one other CNN trained on at least one other separate domain; measuring, via the processor, octave resonance for a plurality of CNNs trained on large data sets with a distribution of octaves for features; measuring a pattern of octaves learned in the CNN, resulting in a measurement pattern; comparing that measurement pattern to the pre-defined features, resulting in a level of adaptability of the CNN; and modifying the CNN based on the level of adaptability of the CNN.

A system configured to perform the concepts disclosed herein can include: a processor; and a computer-readable storage medium having instructions stored which, when executed by the processor, cause the processor to perform operations comprising: measuring, via a processor, feature applicability for an octave of a Convolutional Neural Network (CNN) at a standard scale, resulting in (1) at least one drop-off point where the octave no longer resonates with pre-defined features; and (2) a common drop-off between the CNN and at least one other CNN trained on at least one other separate domain; measuring octave resonance for a plurality of CNNs trained on large data sets with a distribution of octaves for features; measuring a pattern of octaves learned in the CNN, resulting in a measurement pattern; comparing that measurement pattern to the pre-defined features, resulting in a level of adaptability of the CNN; and modifying the CNN based on the level of adaptability of the CNN.

A non-transitory computer-readable storage medium configured as disclosed herein can have instructions stored which, when executed by a computing device, cause the computing device to perform operations which include: measuring feature applicability for an octave of a Convolutional Neural Network (CNN) at a standard scale, resulting in (1) at least one drop-off point where the octave no longer resonates with pre-defined features; and (2) a common drop-off between the CNN and at least one other CNN trained on at least one other separate domain; measuring octave resonance for a plurality of CNNs trained on large data sets with a distribution of octaves for features; measuring a pattern of octaves learned in the CNN, resulting in a measurement pattern; comparing that measurement pattern to the pre-defined features, resulting in a level of adaptability of the CNN; and modifying the CNN based on the level of adaptability of the CNN.

BRIEF DESCRIPTION OF THE DRAWINGS

FIG. 4 illustrates an example visualization of a CactusNet;

FIG. 5 illustrates an example octave CactusNet for a constant octave model;

DETAILED DESCRIPTION

Figure 1:
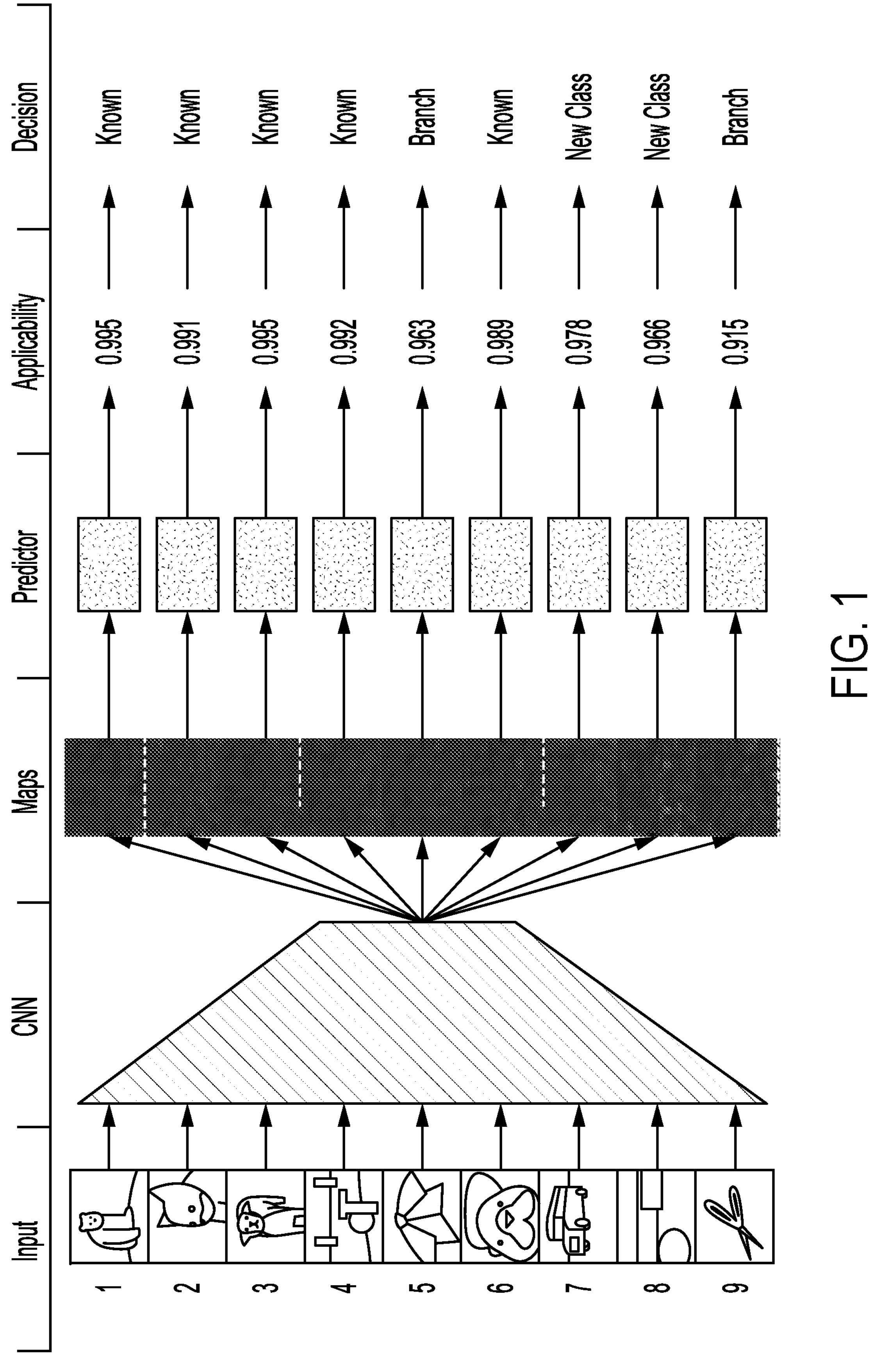
FIG. 1 illustrates an example work flow for applicability predictors.

Various embodiments of the disclosure are described in detail below. While specific implementations are described, it should be understood that this is done for illustration purposes only. Other components and configurations may be used without parting from the spirit and scope of the disclosure.

Over the years, deep neural networks have improved their performance by leaps and bounds. One of the main inspirations for deep neural networks and their research is the biological brain. Mimicking how the brain learns and performs inference has led to new ideas and improvements in the field. Similarly, when studying feature spaces, especially those learned by a deep neural network, it is important to look at how the human brain applies features, to better understand how a deep neural network applies its feature space.

One of the most well understood concepts in feature spaces comes from the concept of transferability. Transferability refers to the concept of applying, or transferring, a learned feature space to a task that the feature space was not originally trained on. Within the same domain, vision, audio, etc, it has been shown that feature spaces generally have large areas of overlap; especially the spaces learned by the lower more generic layers of a neural network. This overlap allows the learned features to be applied to many or even all tasks within the same domain. Indeed, by just transferring the learned feature space, deep neural networks can achieve close to optimal accuracy with no retraining, and convergence in very few shots during training.

The human brain also uses transfer learning to perform zero or one shot learning by using analogy. Humans can perform analogy selectively on problems by applying what they know to part or all of a problem. Unlike in deep neural networks, analogy is able to make connections from seemingly far off domains; far off analogies are also referred to as inspiration. Analogy, and specifically inspiration, are the most complex and advanced methods of feature transfer, and can be the blueprint for achieving the best results for machine learning algorithms in the future for all domains.

The human brain is able to learn features and apply them to almost any scale. By contrast, features learned in a neural network apply specifically to the scale at which they were trained at, creating multiple clusters for the same feature at different scales, or octaves, in the feature space. Lower layer generic features have more scale invariance and greater cluster overlapping, but on the higher layers, the clusters will begin to have greater separation, and the greater the scale difference is. Previous image recognition systems relying on CNNs do not have a metric that can quantify how well the trained features resonate with different scales in a trained neural network.

The following disclosure combines the ability to have a tree-like neural network, with the ability to branch layers or aspects of learned features, the ability to quantify how features of given layers apply to a given object, and the ability to learn new objects or features which may not yet have names or identification. Consider the following example. A CNN has been developed for recognizing a specific subset of different types of animals (e.g., just lions, tigers, and bears). The CNN has different layers associated with the different features of the animals, with some of those layers being shared among all of the animals, and some of the layers associated with features particular to a single known animal (e.g., the mane of a lion, the stripes of the tiger). Systems configured as disclosed herein can identify those particular layers within the CNN, and exchange those particular layers for new layers associated with a distinct (previously) animal, resulting in an updated CNN that could recognize lions, tigers, and dogs instead of bears. Likewise, the CNN can be updated to add the new layers for dogs in such a way that the common layers continue to be implemented, and the only new information required are the layers associated with a dog.

In addition, the system disclosed herein can perform recognition on an object using the original subset (lions, tigers, and bears), and recognize that the object is not any of the known objects. The system can then train a new layer of features associated with the new object, or object type, allowing the system to recognize future occurrences of that object. For example, the system can collect features associated with a dog, or monkey, or other animal, such that it can recognize future occurrences of that animal, even though it does not have a name for that animal. At a later point in time, a system user can look at the unknown but collected objects and provide names for those objects. In this way, the system can recognize distinctions from the known objects and train new layers associated with the features which correlate to that object. To do so, the system uses "Octave Resonance" of the layers within the neural networks. Octave resonance at any layer is a neural network's average differentiability between one octave (scale) and all other octaves.

To make the determination if the features detected correspond to something known or unknown but sufficiently similar to correlate to known features, systems (e.g., computer systems deploying convolutional neural networks and which are configured to perform image recognition) make use of "applicability," a metric for determining which features are quantifiably similar enough to known features that they should be flagged as "new or similar, but different." The system can take these newly detected features and add them to the CNN, and any new instances of that feature can be cataloged according to the updated CNN. At a later point, a system user can review the newly identified features of the CNN and add descriptors. For example, if the system had been trained to identify, via image recognition, lions and tigers, but then was provided pictures of a leopard. A system trained as disclosed herein could identify the applicability of the images of lions or tigers to those of the leopard (or, in some configurations, vice versa), and based on that applicability determine that the images of the leopard are sufficiently similar to justify a new branch within the CNN. A user reviewing the CNN branches can, at a later point, identify the new branch as corresponding to leopards.

The components of the system, followed by more in-depth discussions of the respective components follows. These respective parts are: A special type of pretrained deep neural network, referred to as a "CactusNet"; GAP (General Adversarial Parallelization); and Using Applicability to Quantify Octave Resonance in Deep Neural Networks. The CactusNet allows branching to multiple different higher level layers after each lower level layer, and uses applicability to only route input through branches that are applicable to the current input.

CactusNet: Deep neural networks learn a wide range of features from the input data. These features take many different forms, from structural to textural, and can be very scale invariant. The complexity of these features also differs from layer to layer. Much like the human brain, this behavior in deep neural networks can also be used to cluster and separate classes. Applicability in deep neural networks is the quantitative measurement of the networks ability to differentiate between clusters in feature space. Applicability can measure the differentiation between clusters of sets of classes, single classes, or even within the same class. Metrics and methodology for quantifiably measuring applicability are disclosed herein. The system can also use applicability of features learned through adversarial training.

Lastly, the system can use applicability to create an unsupervised tree-like neural network that uses applicability to facilitate branching and maximized reuse of learned features.

GAP—Quantifying the General Adversarial Set and Class Feature Applicability of Deep Neural Networks: Recent work in deep neural networks has sought to characterize the nature in which a network learns features and how applicable learned features are to various problem sets. Deep neural network applicability can be split into three subproblems; set applicability, class applicability, and instance applicability. Systems configured as described herein can quantify the applicability of features learned during adversarial training, focusing specifically on set and class applicability.

Since their inception, generative adversarial networks (GANs) have been widely applied to a large number of domains including image synthesis, domain adaptation, and data generation. GAN's incorporate two models, a discriminator and a generator, which play a minmax game with one another. A generator Gx tries to produce samples from a target distribution $d_x$, while the discriminator Dx tries to determine whether its input is real, i.e., from $d_x$, or fake, generated by Gx. This minmax game played between the two competing networks minimizes an adversarial loss term, where the end goal is attaining the Nash equilibrium.

GANs require a large volume of training data to learn the mapping onto $d_x$ accurately. Obtaining a large volume of training data, enough for convergence, is one of the greatest challenges in generative adversarial machine learning today. One promising solution is transfer learning. The motivation is there exists some overlap between the features in two different domains. By using the learned features (or at least some of them) from the source domain, the target domain has a built up prior knowledge base. This prior knowledge has been shown to be a good initializer for neural networks that link the source distribution to the desired target distribution.

Acquiring a sizable amount of data, enough for convergence of the training procedure, is a bottleneck in generative adversarial learning today. A promising approach for mitigating this bottleneck is transfer learning or domain adaptation. By using a source domain learned features (or at least some of them), a target domain has a built up prior knowledge base. So long as there is some overlap between the two feature domains, this prior is a good initializer for neural networks.

It should be noted that negative transfer can have the opposite effect on transfer learning. Taking inspiration from self taught learning in humans, learning which features to transfer helps uniformly stabilize the learning process after transfer, combating the negative transfer problem. In neural networks the learned feature space in the early layer(s) is either the same or can have large overlaps and can be transferred to almost any network, however, the ability to transfer breaks down as the features get more specific and the distance between the feature spaces grows. Consequently, quantifying how well learned features can apply to both individual classes and inputs reveals that there are varying degrees of overlap between classes in the same domain as well as across domains. GANs provide a unique opportunity to look into the features of classes with competing parts but with a unified goal.

Recent work on transfer learning has helped improve the understanding of how neural networks learn features and the type of features they learn, by leaps and bounds. Despite this, there has been little to no research on how features are learned during an adversarial process and during synthesis or what features can be transferred in an adversarial training regimen. GANs provide a unique opportunity to look into the features of classes with competing parts but with a unified goal.

Using Applicability to Quantify Octave Resonance in Deep Neural Networks: Features in a deep neural network are only as robust as those present in the data provided for training. The robustness of features applies to not just the types of features and how they apply to various classes, known or unknown, but also to how those features apply to different octaves, or scales. Neural Networks trained at one octave have been shown to be invariant to other octaves, while neural networks trained on large robust datasets operate optimally at only the octaves that resonate best with the learned features. This may still discard features that existed in the data. Not knowing the octave a trained neural network is most applicable to can lead to sub-optimal results during prediction due to poor preprocessing. Recent work has shown good results in quantifying how the learned features in a neural network apply to objects.

CactusNet

The system described herein measures how applicable a given network is to a given piece of data. For a convolutional network, it stands to reason that the pattern and intensity of the high level map responses should be noticeably different depending on whether many high level objects are recognized, and that how much of the image it successfully interprets is closely related to the applicability. The same principle applies to Deep Belief Networks (DBN); it should be possible by observing the neuron responses to determine whether the network (or part of the network) is recognizing familiar patterns. By measuring applicability, the system can tell what problems (networks) an unknown piece of data is applicable to, even without a label. Inversely, the system can immediately tell when the current network is not adequately understanding a new piece of data, and can expand, retrain, or transfer knowledge into the network immediately in real time. This ability to measure network applicability in real time will be one of the key components in learning by analogy, particularly in non-convolution networks where knowledge is abstract mathematical relationships and any knowledge may potentially apply at any layer.

The human brain has the capability to learn representations and apply them to almost any scale. Features learned in a neural network apply specifically to the scale they were trained at, creating multiple clusters for the same feature at different scales, or octaves, in the feature space. Lower layer generic features have more scale invariance and greater cluster overlapping, but on the higher layers, the clusters will begin to have greater separation, the greater the scale difference is.

Systems configured as disclosed herein can, for example, achieve three goals. A neural network has different applicability to different problems (where a problem is a classifying a collection of related classes), termed notion set applicability. First, the system can define and calculate measurable "class applicability" of a given network/layer to a single class. Extending the notions of set applicability and class applicability, there is an individual image applicability for each image (or each input vector in the general case). Second, the system can train a second neural network to estimate this image applicability from the map responses of a convolutional neural network. The methods disclosed herein can predict high or low applicability accurately for classes and images neither of the networks has ever seen before. Finally, the system can execute unsupervised learning on a special type of pretrained deep neural network that termed the CactusNet. The CactusNet allows branching to multiple different higher level layers after each lower level layer, and uses applicability to only route input through branches that are applicable to the current input. Different output layers represent different problem types; one input can be applicable to multiple problems. When an input is not applicable to any existing problem, the system can create a new branch from the most applicable existing features, and start learning the remaining unknown features for the newly created problem type. A system configured as disclosed herein may perform any or all of these three goals/features.

To accomplish these goals/features, the system can perform various computations. First, the system can measure feature applicability for an octave, referred to as octave resonance, at a standard scale. Second, the system can measure the octave resonance for networks trained on large data sets with a distribution of octaves for features. Lastly, the system can measure the layer octave resonance.

Benefits of the system include: lifting the veil over the features learned during an adversarial training process, specifically for adversarial synthesis models, identifying/demonstrating differences between the learned features in a discriminative (i.e., discriminating whether its input is real or fake) and a classification process, and measuring the transferability of features to a GAN by the applicability of features to the generator and discriminator using the Fréchet Inception Distance (FID).

Over years, researchers have worked to improve the transferability in neural networks. Deep Adaptive Networks (DAN) increase the transferability of task-specific features by matching different feature distributions in a reproducing kernel Hilbert space. Similar to the proposed method, DANs assume that the target dataset has little to no labeled data. DANs use multiple kernel maximum mean discrepancies (MK-MMD) to minimize the error between two datasets to facilitate greater transferability. The method instead quantifies how well a neural network knows or can recognize an input to facilitate unsupervised learning.

Transfer learning has also been explored for unsupervised learning as well. In survey of how transferability can be applied to unsupervised learning, transfer learning applications would improve significantly if the underlying variation in high-level features could be disentangled and made more invariant. In this work, the system uses applicability to demonstrate where in a network the features of an input go from invariant to variant. This point of inflection is where the CactusNet creates a branch and circumvents invariance at the more varying and more specific layers.

The human mind identifies and clusters objects based on their features regardless of whether an object is known or not. Adaptive resonance theory (ART), is a machine learning theory that attempts to determine whether an object belongs to a known object class by comparing the detected features of the object with the expected features of all known classes individually. If the smallest difference between the detected features of the object and some known class's expected features is within a set threshold then the object is classified and is considered to belong to that class. This threshold is known as the vigilance parameter. If the difference exceeds the vigilance parameter, however, the object is considered to belong to a new class. This allows ART to perform unsupervised learning as it classifies not based on a target class, but differences in features. Over the years, several new variations of ART have been proposed including Fuzzy ART which, uses fuzzy logic to improve ART's stability.

For deep neural networks, regardless of domain, learning is done by fitting a distribution of features at each layer of the network, where the larger the dataset, the better fit the feature space is. By transferring the learned weights from one domain to a similar one and performing moderate fine-tuning on available data, a network can achieve convergence quickly and without a large dataset. Transferring weights has found usage in diverse applications that involve image classification and language processing.

One of the fascinating behaviors that transfer learning utilizes is the generic to specific nature in which features are learned. It is known that the lower layers of neural networks pick up generic features, that are common to almost all inputs for a specific input type, such as images. As the inputs make a forward pass up the network, the learned features become more and more specific to the domain and class of the input. Applicability is a quantitative measure of transferability, or domain adaptability, measuring how well the features from a learned task apply to any other task, including the learned task.

Transfer learning aims to use commonalities in different probability distributions to find a minimum link between the two distributions. The large volumes of labeled data required to train neural networks, and their ability to learn abstract and transferable representations of objects have made these models a good platform for exploring transfer learning. Transferability and domain adaptability have enjoyed success in different applications including image classification natural language understanding and activity recognition.

Various techniques have been explored to learn the best possible domain adaptation. One such approach minimizes the distance between the feature domains to reduce domain variance over minimizing classification error. Adversarial training has been used to understand whether a source domain is aligned with the target to combat the general to specific structure of learned features. While transferring can be a useful tool for datasets with limited amounts of labeled data, it is important to know which domains should be used as the target. Quantitative work in analyzing the effect target data size has on transferability has shown that large disparities can negatively affect transferability. By adapting from multiple sources to compensate, the disparity problem can be overcome. Applicability is defined as how well learned features can apply to different classes. There are three types of applicability: set, class, and instance. Each measures the amount of transfer from different scales of the network.

In recent years, generative adversarial networks have taken many forms and architectures that cover both supervised and unsupervised learning. GAN's ability to deliver accurate and realistic outputs in case of synthesis problems have seen their usage explode. This has spurred a lot of research focusing on how GANs operate internally. Recent ground breaking work has shown that on a level playing field most GAN algorithms can reach the same performance scores.

Applicability: The system defines class applicability for a trained layer in a deep neural network on an input as how well the known features can be used to differentiate the input class from all other input classes. Within an objective (classifying natural images), the system identifies three subsets, nonobjective unknown, objective unknown, and objective known. In the case of natural images objective known are images of classes the network has been trained on, while objective unknown are natural images of classes the network has never been trained on. Finally, nonobjective unknown are images of man made classes the network has never been trained on.

Together these three groups cover a wide range of applicabilities from low to high, allow training a predictor. For a single class in this set the system compares it in a series of one vs. one classifications to a separate group of classes that approximate the set of all possible inputs in a domain (be they images, sound, text, etc.)

Given a deep neural network N, and a number of unknown objective and nonobjective classes, the system approximates the set of all possible classes, giving an unknown set, un, of k=20 classes. To find the class applicability at layer $n_i$ in a neural network $N=\{n_0, n_1, n_2, \ldots, n_z\}$ for a given class, x, the system measures the ability of N to differentiate x from all the classes in un. The system pairs x with every class $un_j$ in $un=\{un_0, un_1, un_2, \ldots, un_k\}$. For each (x, un) pair the system fine-tunes N with all its layers up to n, frozen, and record the test accuracy $\xi_j$. This accuracy represents how well x can be differentiated from $un_j$ using learned features from all the layers at and before $n_i$ which the system will identify by the function shown $N((x, un_j), n_i)$ in equation 1 where $N((x, un_j), n_i)$ indicates the neural network N fine-tuned with the layers $n_1, \ldots, n_i$ frozen.

$$\xi_j = N((x, un_j), n_i) \tag{1}$$

To obtain the class applicability of m on x the function $N((x, un_k), n_i)$ must be applied to all the classes $un_k$ in un. The class applicability metric is then the average differentiability between x and all other $un_j$ individually. This is shown in equation 2.

$$App_x = \frac{\sum_{j=1}^{z} \xi_j}{z} \tag{2}$$

The system is set up for the class applicability such that the average class applicability across all classes should approach the average separability between single pairs of classes. By extension, individual image applicability across a class should average to the class applicability. The system then trains a second neural network to estimate image applicability from the map responses, using class applicabilities as labels.

Applicability Predictor: The key factor for the CactusNet architecture described below is its ability to branch at every layer for new classes. This branching is what allows for maximum reuse of already learned features. To branch at each layer some threshold 0 must be defined for each layer. The system defines three thresholds each corresponding to the three subsets identified for an objective (objective known, objective unknown, and nonobjective unknown). The threshold for a subset at a given layer is the average applicability across some representative sample of that subset.

In addition to the threshold, the CactusNet needs to have the ability to calculate the applicability of a given input in real-time and without sample classes from the three subsets. To calculate this applicability, predictor networks are created for each layer. For a given input within the objective of a pretrained deep neural network, the applicability network gives the predicted applicability of that layer's features for the input.

The system trains the applicability predictors on large samples from the three subsets of the objective. The inputs for the network are the feature activations while the targets are the applicability of that specific class. The network uses a categorical cross class entropy loss function, and a Rectified Linear Activation Function ("ReLu") to generate an approximate applicability for an input.

Datasets: ILSVRC2012 consists of 1.2 million images from 1000 classes. The object classes can be split between man-made and natural objects. The system, in this example, uses the same split as described in that gives 449 natural classes and 551 man-made classes. The 449 natural classes were used to train a convolutional neural network to classify between them.

The system defines applicability as how well a layer's features can be used to differentiate the input class from all other input classes. It would be difficult to get a representative sample of all possible input classes, so the example system discussed herein approximates this with 20 classes the network has not been trained on, 10 natural and 10 man-made. In other configurations, more or fewer classes can be used. The system only uses classes the network has not been trained on because any finite network would be specifically trained on a small fraction of the infinite set of all possible image classes; so a sample with all unknown classes should be more representative.

To calculate class applicability, the system separates classes into the three subsets: unknown objective, known objective, and unknown nonobjective. In such applications, the objective set is the natural set while the man-made represents the nonobjective set. The system, in this example, uses 10 classes for each set to train with a good mix of high, medium, and low applicability targets. The 10 classes used for the unknown objective were natural classes that the network had not been trained on. So in all 50 classes, 30v20, were used for applicability testing: 30 classes to measure the applicability of, and 20 to approximate all possible classes to compare them against to actually find that applicability.

TABLE I

| Class | Toilet paper | Gong | Buckle | Bucket | Pen | Lavender | Giraffe |
|---|---|---|---|---|---|---|---|
| Moth(NU) | 0.98 | 0.932 | 0.952 | 0.964 | 0.976 | 0.972 | 0.98 |
| Nutria(NU) | 0.972 | 0.992 | 1 | 0.98 | 1 | 1 | 0.988 |
| Screwdriver(MM) | 0.928 | 0.9 | 0.864 | 0.92 | 0.96 | 0.988 | 0.976 |
| Coffee-machine(MM) | 0.808 | 0.78 | 0.808 | 0.78 | 0.7 | 0.988 | 1 |
| Tabby Cat(NK) | 0.928 | 0.984 | 0.968 | 0.956 | 1 | 1 | 1 |
| Bee(NK) | 0.988 | 0.992 | 0.944 | 0.976 | 0.984 | 0.956 | 0.992 |
| Natural Unknown | 0.9708 | 0.9652 | 0.9824 | 0.9796 | 0.9888 | 0.9916 | 0.9876 |
| man-made | 0.899 | 0.882 | 0.9172 | 0.9052 | 0.926 | 0.9932 | 0.986 |
| Natural known | 0.9632 | 0.974 | 0.9748 | 0.9792 | 0.9816 | 0.9872 | 0.9924 |

Applicability Testing: The applicability of a class at a specific layer is defined as the average differentiability between that class and all other classes in the unknown set.

This involved training 1v1 convolutional neural networks with all the layers at, and before, the testing layer frozen. The final validation accuracy was used as the differentiability metric between the two classes. In all 600 1v1 convolutional neural networks were trained. Table I gives an example of the layer 5 separability between six classes, one from each subset, and ten of the test classes, while Table II gives the applicability for 3 classes at each layer. The set each class belongs to is marked next to the name. Each row belongs to the set of 30 classes that covered all three objective sets, while columns are classes from the set of twenty that left out the natural known set. Within Table II, Dolphin is part of the Natural Unknown set, while Llama is part of the Natural Known set.

TABLE II

| Class | Conv1 | Conv2 | Conv3 | Conv4 | Conv5 | FC6 | FC7 |
|---|---|---|---|---|---|---|---|
| Dolphin | 0.987 | 0.982 | 0.979 | 0.978 | 0.9726 | 0.964 | 0.953 |
| Coffee Mug | 0.945 | 0.944 | 0.941 | 0.930 | 0.914 | 0.899 | 0.884 |
| Llama | 0.985 | 0.982 | 0.980 | 0.978 | 0.967 | 0.957 | 0.942 |

The system can plot the average applicability for each of the three subsets as they move through the network. This result reinforces the results from where learned features start generic but become more specific the farther along the network. The features are less applicable to unknown non-objective classes at the higher layers which would indicate the need for branching. The features are fairly applicable to unknown objective classes even at the higher layers which makes sense given that even high level features are bound to have some overlap for all classes, known or unknown, in the same objective. In some cases, there may be an unexpected gap between the applicability for man-made objects and the known objects, suggesting that perhaps some edge detectors are more applicable to natural images and vice versa. In some cases, the spread of the applicability between classes increases between the natural and man-made sets. Due to the large nature of even the natural half of ILSVRC12 there are many features that are likely applicable to even manmade objects, but there is also a gap of unknown features that would be applicable to the man-made set. Applicability Predictor Evaluation: To predict the image applicability, the system uses small CNN's as applicability networks. The input for each predictor is the corresponding layer's output which is treated as a (h, w, maps) image where maps is the number of feature maps within that layer. Each convolution block in the predictor consists of two convolutional layers and a 2×2 max pooling layer. Each convolutional layer in the first block contains 32 filters, while those in the second block contain 64. For fully connected layers the system made modifications to the predictors and treated the layer output as an image of shape (1, 1, outputs). The system trains the networks by minimizing the loss function in eq. 3 where x' is the target value and is the predicted value.

$$\mathcal{L} = \frac{1}{n}\sum_{i=1}^{n}\left(x^i - \hat{x}^i\right)^2 \tag{3}$$

The average training MSE was recorded to be 0.1485 across all the applicability predictor networks. To test the applicability predictors each predictor was tested on a class from each objective subset that the predictor was not trained on. For the test data, the recorded MSE was 0.4889. The training and testing mean squared (MSE) error for each layer are listed in table. III.

TABLE III

| Test | Layer | Validation |
|---|---|---|
| 0.1893 | Conv1 | 0.3108 |
| 0.1538 | Conv2 | 0.6137 |
| 0.1238 | Conv3 | 0.6632 |
| 0.1657 | Conv4 | 0.4252 |
| 0.1433 | Conv5 | 0.4857 |
| 0.1253 | PC6 | 0.3883 |
| 0.1382 | PC7 | 0.5344 |

In some cases, the applicability networks are able to distinguish if the CNN has or has not been trained on an image even if they are both highly applicable. For example, if a plot of layer by layer predicted applicability versus actual applicability indicates (within a predetermined threshold) that the applicability predictors are able to produce an image applicability that is very close to its true value. In Table IV, the system gives sample results from the conv4 applicability predictor, comparing actual class applicability versus the predicted image applicability for twelve sample images from three classes, each from one of the objective sets. Interestingly the predictions on the man-made dataset tend to have the most variance, but none of the predictions overshoot the target value by very much.

TABLE IV

| Objective | Actual | Predicted | Error |
|---|---|---|---|
| Nat Unknown | 97.82 | 97.95 | 0.13 |
| Nat Unknown | 97.82 | 97.95 | 0.13 |
| Nat Unknown | 97.82 | 98.26 | 0.44 |
| Nat Unknown | 97.82 | 97.90 | 0.08 |
| Nat Known | 98.70 | 98.84 | 0.14 |
| Nat Known | 98.70 | 97.91 | 0.79 |
| Nat Known | 98.70 | 98.82 | 0.12 |
| Nat Known | 98.70 | 98.44 | 0.26 |
| Man-Made | 95.92 | 96.70 | 0.78 |
| Man-Made | 95.92 | 97.31 | 1.36 |
| Man-Made | 95.92 | 94.80 | 1.12 |
| Man-Made | 95.92 | 95.34 | 0.58 |

FIG. 1 illustrates an example work flow for applicability predictors in CactusNet. The feature maps are extracted from the CNN, and fed into the applicability predictors, which then produce a predicted image applicability. As illustrated, an image in input into the CactusNet system, which is entered into the CNN. The CNN maps the image, and a predictor is generated which can be used to determine if the image is applicable to a target objective, and if the image is sufficiently similar to other known images to qualify as "known." For example, If an animal, previously unknown to the system, is presented to the system, in addition to determining of the animal matches whatever objective the system user is pursuing, the system can also determine if it has ever seen that animal before. If not, the system can add that animal to its catalog and ask a user for identification.

Figure 2:
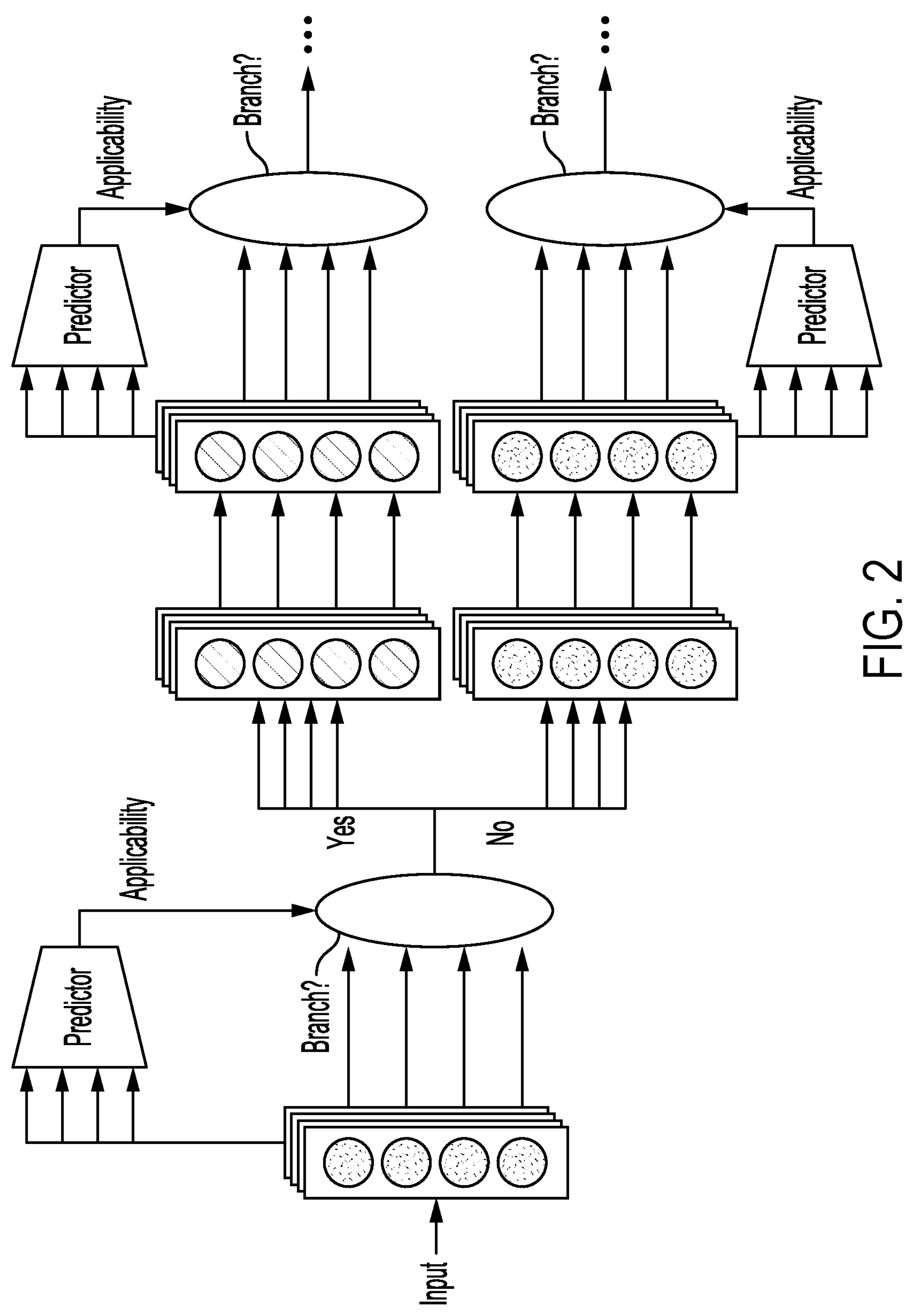
FIG. 2 illustrates an example architecture for a CactusNet.

The architecture of the CactusNet is shown in FIG. 2. As illustrated, for each layer the output is sent to the applicability predictor. If the applicability is below the branch threshold, then a branch is created. Otherwise the input continues down the main branch.

Figure 3:
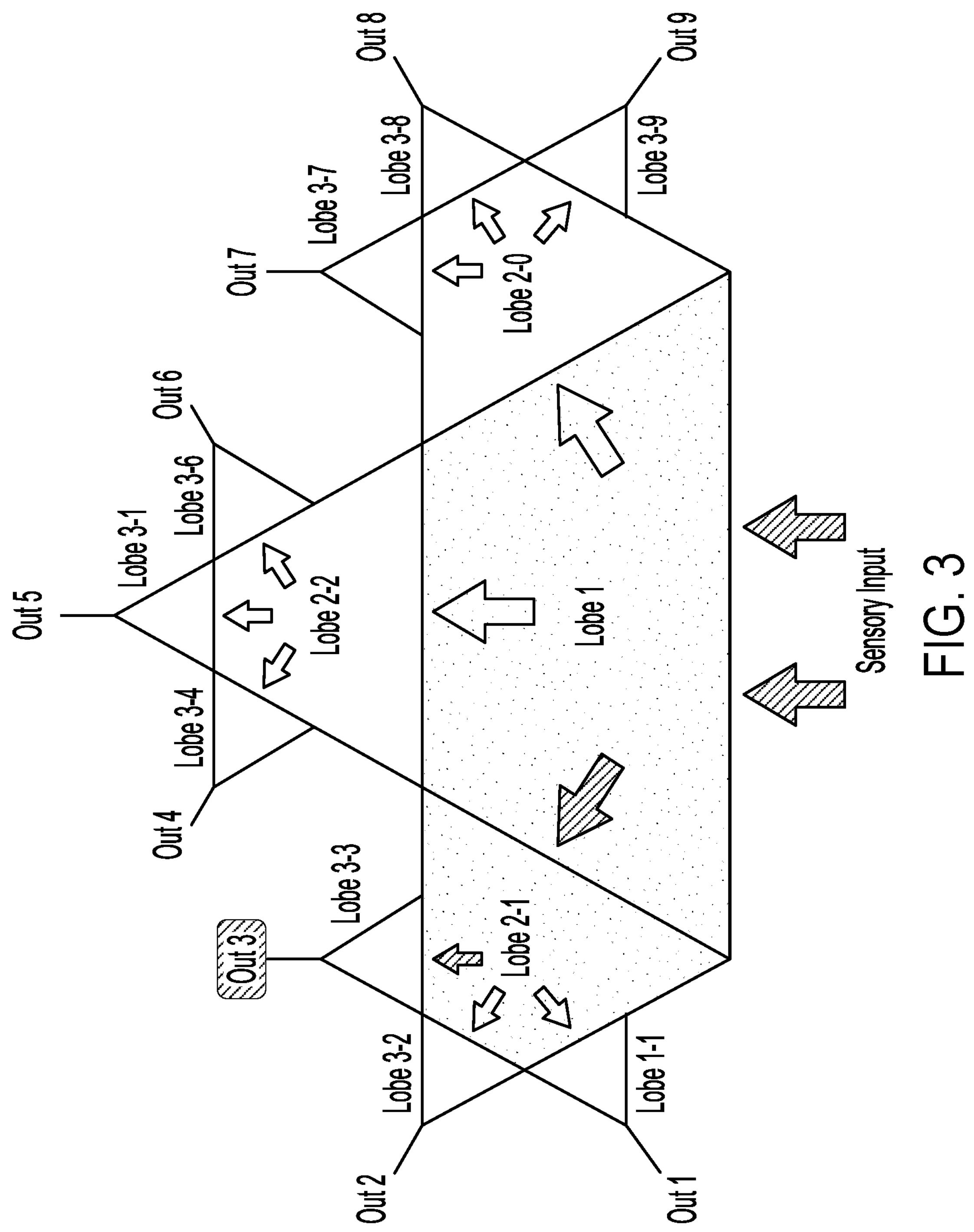
FIG. 3 illustrates an example of a CactusNet growth structure.

The branching structure for the CactusNet is shown in FIG. 3 and its algorithm is described in Algorithm 1.

Algorithm I
Algorithm I: CactusNet Algorithm

```
1   Input          : Network Input x;
                     List of applicability networks A.
    Output: Class label l.
2                    Fine-tuned network N.
3   initialize l ← ∅;
4   initialize thresholds t1 and t2;
5   for i=l to k do
6     |    Get features at each candidate ni;
7     |    app ← ni with max(applicability);
8     |    if app > t1 then
9     |      |    classify normally;
10    |      |    return l ← class
11    |    end
12    |    else
13    |      |    if app ≤ t1 and app > t2 then
14    |      |      |    l ← objectiveunknown
15    |      |    end
16    |    end
17    |    else
18    |      |    if app ≤ t2 then
19    |      |      |    l ← nonobjective unknown
20    |      |    end
21    |    end
22  end
```

The CactusNet uses the predicted image applicability of an input to determine whether the given input is either objective known, objective unknown or nonobjective unknown, and branches accordingly. The base of the CactusNet is a pretrained deep neural network. This network can be trained on any objective, and need not even be well trained for that objective. The minimum requirement is that the network has learned some features that are applicable to its target objective. The CactusNet's branching architecture is designed to efficiently handle large numbers of classes. The lower layers that contain generic features and are applicable to most every class are shared amongst all classes, minimizing the resources allocated to each new class. In the event an output layer does contain too many classes the system can split by applicability and create two new branches. The applicability can be used to route inputs to the correct branch.

Methodology: For an input x, the system computes the feature representation for each layer $n_i$ down the network. The system then computes the predicted applicability for a layer using the feature representations and that layers applicability predictor network. If the applicability is below the threshold set to determine if the class is new or not, then the system branches off the current network trunk at layer m.

After branching, the architecture of the network can remain the same as the original branch, or a different architecture can be used as long as it is compatible with the shared layers in the original trunk of the CactusNet. Once a new branch is generated, then the CactusNet automatically assumes the input is of a new class and will commence learning. Given that the system has not inherently modified the network architecture, the CactusNet is flexible in its operation, especially for learning. If the desire is for the CactusNet to learn from a few training examples, then any of the existing one shot learning methods can be used to train a new branch. If a simpler method is desired, then all classes, whether known or unknown, can be input in tiny batches for traditional learning. The path an input takes down the network is determined by its applicability at each layer. When branching occurs, the applicability threshold acts as a guide diverting inputs down the correct path. There can be any number of branches at a given layer.

Once a layer is trained, the applicability threshold of that layer is found from the applicability predictor's training results. Once a layer n is found to be applicable, the layer output is forwarded down all branches leading off the current branch, to all candidates for layer $n_{i+1}$. Each candidate processes the data and checks its applicability to that data. If the applicability is above at least one layer's threshold, the layer with the highest applicability becomes layer $n_{i+1}$ and the input x is routed there and to all branches leading off from there. If the applicability of x for the layer at the end of every branch $b_i$ falls below that layer's threshold, then a new branch for x will be created. The growth structure of the CactusNet is shown in FIG. 3. FIG. 3 uses the term lobe to denote a branch.

Convolutional CactusNet: Using the ImageNet 2012 dataset the system trained a convolutional CactusNet. The base network is trained on 10 natural classes which make up the known set. In this example the system uses 20 unknown classes, 10 objective and 10 nonobjective, to create the CactusNet. The classes that are uses in the CactusNet are presented in Table V.

TABLE V

| Known | Objective Unknown | NonObjective |
|---|---|---|
| Cheetah | Giraffe | Car |
| Cat | Dolphin | Airplane |
| Dog | Bear | 18-Wheeler |
| Butterfly | Flower | House |
| Whale | Cow | Basketball |
| Tree | Beetle | Tractor |
| Chicken | Cactus | Boat |
| Eagle | Sponge | Pickup |
| Elephant | Stingray | Skyscraper |
| Swordfish | Cardinal | Bicycle |

The system uses a set up similar to that in FIG. 3 where the applicability is measured using trained applicability predictors are trained after the neural network is trained to ensure that the predictors learn from the final feature maps from the neural network. The test data from the neural network training is uses to train the predictors, with the validation data used for testing and validation. The original network in the CactusNet contains five convolutional layers followed by 2 fully connected layers, the last being for classification. Every branch in the CactusNet will follow the same structure; every input will travers 7 layers total regardless of branching. For example, if a class branches at layer 3 then there will be 4 layers in their new branch. The layers in a new branch are initialized with the weights from the equivalent layers from the branch the the CactusNet just branched from.

A visualization of the resulting CactusNet is provided in FIG. 4. As illustrated, the resulting CactusNet contains (in this example) five branches, labeled A through F. The classes contained in the clock corresponding to the branch label. All known classes exist in branch C. All the labels for the classes were added after to FIG. 4 after the CactusNet was trained. During training all unknown classes were unlabeled. It is no surprise to see that branches only occur after the second convolutional layer when the learned features begin to become more class specific. All the nonobjective (manmade) classes, with one exception, branched early after the second convolutional layer. The one nonobjective class, basketball, that did not branch made it all the way up the main branch. This is likely a result of the simplistic features that identify a basketball. The learned features in the known branch were highly applicable to basketball, and only required the class to be added to the final fully connected layer.

With the limited number of classes used in the CactusNet is easy to see correlations between the classes and features in each branch. Classes added to the main branch were mammals four legged animals close to many of the known classes, basketball as discussed earlier and dolphin which is similar to the known class whale. All these classes have many, and likely most, of their features already known by the network. Branch A contains classes that all have wheels. While wheel is certainly not the only identifier for branch A it is likely a key feature in separating branch A from main branch C. However, wheels are likely not a key feature in identifying classes in branch A since it does not differentiate the classes.

Table VI presents that test accuracy for each branch of the CactusNet. Each branch of the CactusNet has high accuracy. The longer the branch is the test accuracy is hire. In these cases, the branch has more features specifically trained for its own classes. Shorter branches reuse more features learned from classes not in that branch. While these reused features are applicable, it is interesting to see a drop off between the reused features and the longer more specialized branches. This fits with the CactusNets intention to optimize reuse of features for new classes.

TABLE VI

| Branch | Test Accuracy |
|---|---|
| A | 0.995 |
| B | 0.988 |
| C | 0.994 |
| D | 0.995 |
| E | 0.992 |
| F | 0.989 |

Octave Resonance: Applicability, traditionally, has little concern for scale. To compute octave resonance, un must be split into subsets based on the octave where points in one cluster can be transformed into another via some common function $x \rightarrow z(x)$; in this case $z(x)$ is zooming in or out an octave. When checking for the octave resonance, it is not useful to check within the same set. Instead, the comparison is between one set and the rest. Keeping this in mind, octave resonance is then redefined as a trained neural network's ability to differentiate an input from one octave from inputs across all other octaves. The octaves that resonate best with the learned features will have the highest amount of differentiation between classes. This changes Eq. 1 to Eq. 4.

$$\xi_j = N((z_k(x), un_j), n_i) \tag{4}$$

Where input x is transformed to the octave set k with transformation z, and compared to all classes in un. In this case, un still covers all the octave subsets.

Network Octave Variation: Because neural networks have a finite number of trainable parameters, there is a cap on the amount that can be learned. For a neural network to have effectively learned an octave within its training set, it would have to fit to the distribution of the features for the octave that exist within the training dataset. Even over a large training set, a neural network will likely ignore the least common octaves, as those features would not be identified as important.

Layer Octave Resonance: While the system measures the octave resonance for the entire model, applicability can also be measured for individual layers. Layer applicability is identical to full model applicability, except every layer from the first layer through the layer being measured are frozen. Model applicability is then the layer applicability for the final layer of the model.

Octave Resonance Evaluation: The exemplary datasets described herein come from two primary categories. The first are datasets which contain objects at only one scale, and the second are datasets that contain multiple scales. The features resonate with various octaves across the two dataset types.

Datasets: In testing the system, four primary datasets were used: MNIST, Bangla Numeral, CIFAR10, and ILSVRC2012. In practice other appropriate datasets may be used. To test the accuracy of the system, the four datasets were separated into two groups of two each. The first group consists of the MNIST and Bangla Numeral datasets which both have a consistent octave. The second group, CIFAR10 and ILSVRC2012, are datasets that cover multiple octaves.

There are an infinite number of octaves with which an octave can be compared against, the system instead tests over a finite, but representative range of octaves. Zero padding is used for all the images that have outward zooming. The system found during testing that the models have little meaningful variance for scale factors outside of range z=(0.01, 6.0).

Octave Resonance Evaluation: Octave resonance at any layer is a neural network's average differentiability between one octave and all other octaves. To compute octave resonance, the system finetuned a 1v1 neural network for all possible combinations of classes across all octaves, excluding identical pairs at different octaves, for each dataset. The layer(s) before and at which the applicability is being computed are frozen to preserve the learned features and octaves. The validation accuracy between the two classes, after convergence, is the differentiability metric between the two classes. The average differentiability metric for each octave is the applicability of that octave and the average differentiability for each class in each octave.

Constant Octave Model: For testing the constant octave models, the system trained models on two datasets that maintain a fairly consistent scale throughout, the MNIST dataset and the Bangla Numeral one. For the MNIST and Bangla Numeral datasets, there were 170 1v1 neural networks trained. In Table VI-C is a numerical breakdown of octave resonance for each class, for select octaves, in the MNIST dataset.

TABLE VI-C

| Class | 0.01 | 0.05 | 0.1 | 0.15 | 0.2 | 0.25 | 0.5 | 0.75 | 1.0 | 1.25 | 1.5 | 1.75 | 2.0 | 3.0 | 4.0 | 5.0 | 6.0 |
|---|---|---|---|---|---|---|---|---|---|---|---|---|---|---|---|---|---|
| 0 | 0.00 | 0.00 | 0.00 | 0.00 | 0.00 | 0.00 | 0.02 | 0.93 | 1.00 | 0.95 | 0.86 | 0.44 | 0.77 | 0.05 | 0.03 | 0.03 | 0.01 |
| 1 | 0.00 | 0.00 | 0.00 | 0.00 | 0.08 | 0.00 | 0.96 | 0.99 | 1.00 | 0.98 | 0.97 | 0.94 | 0.93 | 0.71 | 0.35 | 0.15 | 0.06 |
| 2 | 0.00 | 0.00 | 0.00 | 0.00 | 0.00 | 0.00 | 0.35 | 0.99 | 0.99 | 0.96 | 0.84 | 0.63 | 0.53 | 0.34 | 0.27 | 0.23 | 0.23 |
| 3 | 0.00 | 0.00 | 0.00 | 0.00 | 0.42 | 0.00 | 0.35 | 0.98 | 0.99 | 0.96 | 0.78 | 0.31 | 0.10 | 0.03 | 0.10 | 0.12 | 0.14 |

TABLE VI-C-continued

| Class | 0.01 | 0.05 | 0.1 | 0.15 | 0.2 | 0.25 | 0.5 | 0.75 | 1.0 | 1.25 | 1.5 | 1.75 | 2.0 | 3.0 | 4.0 | 5.0 | 6.0 |
|---|---|---|---|---|---|---|---|---|---|---|---|---|---|---|---|---|---|
| 4 | 0.00 | 0.00 | 0.00 | 0.00 | 0.00 | 0.00 | 0.40 | 0.94 | 0.99 | 0.96 | 0.89 | 0.64 | 0.54 | 0.16 | 0.05 | 0.01 | 0.01 |
| 5 | 0.00 | 0.00 | 0.00 | 0.10 | 0.01 | 0.00 | 0.13 | 0.84 | 0.98 | 0.96 | 0.86 | 0.66 | 0.46 | 0.14 | 0.09 | 0.08 | 0.07 |
| 6 | 0.00 | 0.00 | 0.00 | 0.00 | 0.00 | 0.00 | 0.01 | 0.98 | 0.99 | 0.94 | 0.82 | 0.76 | 0.62 | 0.36 | 0.24 | 0.16 | 0.11 |
| 7 | 0.00 | 0.00 | 0.00 | 0.00 | 0.00 | 0.00 | 0.07 | 0.94 | 0.99 | 0.96 | 0.85 | 0.74 | 0.68 | 0.49 | 0.33 | 0.23 | 0.35 |
| 8 | 0.00 | 0.00 | 0.00 | 0.00 | 0.00 | 0.00 | 0.02 | 0.95 | 0.99 | 0.92 | 0.67 | 0.31 | 0.20 | 0.21 | 0.30 | 0.33 | 0.33 |
| 9 | 0.00 | 0.00 | 0.00 | 0.01 | 0.04 | 0.01 | 0.85 | 0.94 | 0.98 | 0.94 | 0.72 | 0.40 | 0.16 | 0.04 | 0.06 | 0.07 | 0.04 |

Looking at Table VI-C, we can see a clear applicability peak centered around the original octave. This is corroborated by the fact that the models were trained on a fairly constant octave, in addition to the fact that the set of features under consideration are relatively simple. The mode of the applicability for the classes varies in length slightly, some lasting much longer, but in general the applicability for scales 0.75, 1, and 1.25 are above 0.9 before dropping off, sometimes drastically.

There are classes, like class 1 in MNIST, that have a less drastic applicability drop off when upscaling. This is likely a result of certain classes possessing scale invariant features. For example class 1 in MNIST is very simple and could possibly be defined by a vertical edge detection feature. This feature can exist regardless of scale and will lead to higher differentiability for larger scales than more complex scale variant features. This behavior also affects the accuracy of the low end features. When down scaling, the applicability has a much steeper drop-off before settling at close to 0.

Because the scale of the inputs varies between all the images, the model will learn the features at the most common or important octaves. This will partially exclude some octaves from the feature set reducing the applicability for individual images on the periphery of the feature space.

Varying Octave Model: Similar to case of the constant octave models, the system trained 170 1v1 models for both the CIFAR10 and ILSVRC2012 datasets. In the case of ILSVRC2012, the system used ten classes from the dataset to test on. For the more complex models, the system used the ResNet model for both the ILSVRC2012 and CIFAR10 datasets. In Table VII are numeric values for the octave resonance for the CIFAR10 classes.

Octave Resonance of Unknown Classes: It is also valuable to observe how octaves react to classes that the features are not necessarily learned for. Because the lower layers were frozen, the unknown classes are fitting themselves to features that might not necessarily apply perfectly to them.

Layer Octave Resonance: It has been shown that the applicability of earlier layers in a neural network is high for almost all classes in a domain, known or unknown. Generic features are represented at the earlier layers of a neural network and have more applicability across the domain. The octave resonance diminishes as the layers become more specific, where, by the last layer the octaves on the extremes have substantially lower applicability than the original octave.

Octave CactusNets: The system creates the Octave CactusNet is much the same fashion as described above. The key difference for the Octave CactusNet is that the main branch is trained on all classes. The unknown classes are instead the known classes that are up scaled and down scaled. The system uses the same scaling that is used in Table VI-C and Table VII, where 1.0 is the known octave. The system trains a constant octave, on MNIST, and variable octave CactusNet, on CIFAR10, to observe the behavior each have on the resulting CactusNet.

Octave CactusNets also use applicability predictors to measure the applicability of individual inputs at each layer. The data is split between train and test using a 70/30 split. The test data is split in half, 15% of total, and used for applicability predictor training. The images in the applicability predictor dataset are scaled to each octave the Cactus will be tested on. The labels are the resonance for that class at that octave.

TABLE VII

| Class | 0.01 | 0.05 | 0.1 | 0.15 | 0.2 | 0.25 | 0.5 | 0.75 | 1.0 | 1.25 | 1.5 | 1.75 | 2.0 | 3.0 | 4.0 | 5.0 | 6.0 |
|---|---|---|---|---|---|---|---|---|---|---|---|---|---|---|---|---|---|
| bird | 0.00 | 0.00 | 0.00 | 0.00 | 0.00 | 0.00 | 0.35 | 0.99 | 0.99 | 0.96 | 0.95 | 0.93 | 0.90 | 0.64 | 0.47 | 0.33 | 0.30 |
| cat | 0.00 | 0.00 | 0.00 | 0.00 | 0.00 | 0.10 | 0.35 | 0.98 | 0.95 | 1.00 | 1.00 | 1.00 | 0.95 | 0.62 | 0.20 | 0.12 | 0.14 |
| deer | 0.00 | 0.00 | 0.00 | 0.00 | 0.00 | 0.14 | 0.95 | 0.98 | 1.00 | 0.99 | 1.00 | 0.00 | 0.99 | 0.94 | 0.69 | 0.43 | 0.29 |
| dog | 0.00 | 0.00 | 0.00 | 0.00 | 0.00 | 0.30 | 0.85 | 0.92 | 1.00 | 1.00 | 0.95 | 0.94 | 0.88 | 0.84 | 0.59 | 0.48 | 0.25 |
| frog | 0.00 | 0.00 | 0.00 | 0.00 | 0.00 | 0.15 | 0.50 | 0.98 | 1.00 | 1.00 | 1.00 | 0.96 | 0.94 | 0.88 | 0.77 | 0.63 | 0.50 |
| horse | 0.00 | 0.00 | 0.00 | 0.00 | 0.00 | 0.00 | 0.45 | 0.97 | 0.98 | 1.00 | 1.00 | 0.99 | 0.95 | 0.72 | 0.30 | 0.15 | 0.09 |
| ship | 0.00 | 0.00 | 0.00 | 0.00 | 0.00 | 0.01 | 0.12 | 0.19 | 0.88 | 0.94 | 0.99 | 0.99 | 0.85 | 0.57 | 0.40 | 0.33 | 0.33 |
| truck | 0.00 | 0.00 | 0.00 | 0.00 | 0.04 | 0.09 | 0.85 | 0.94 | 0.98 | 0.94 | 0.92 | 0.80 | 0.66 | 0.40 | 0.33 | 0.16 | 0.07 |

It is notable that compared to the single octave datasets, the applicability peak lasts substantially longer and the drop-off for upscaling is much less drastic and more gradual. The opposite is true in the down scale direction. While the mode does persist longer for the down scaling, the drop-off is extreme, almost as if there is a point where no feature can fit that octave. Another cause for the rapid applicability drop-off is the 0 padding. Unlike the constant octave models, the training datasets images are RGB and not binary. The zero padding adds an unnatural artifact to the image that could be the cause of the applicability drop.

Figure 6:
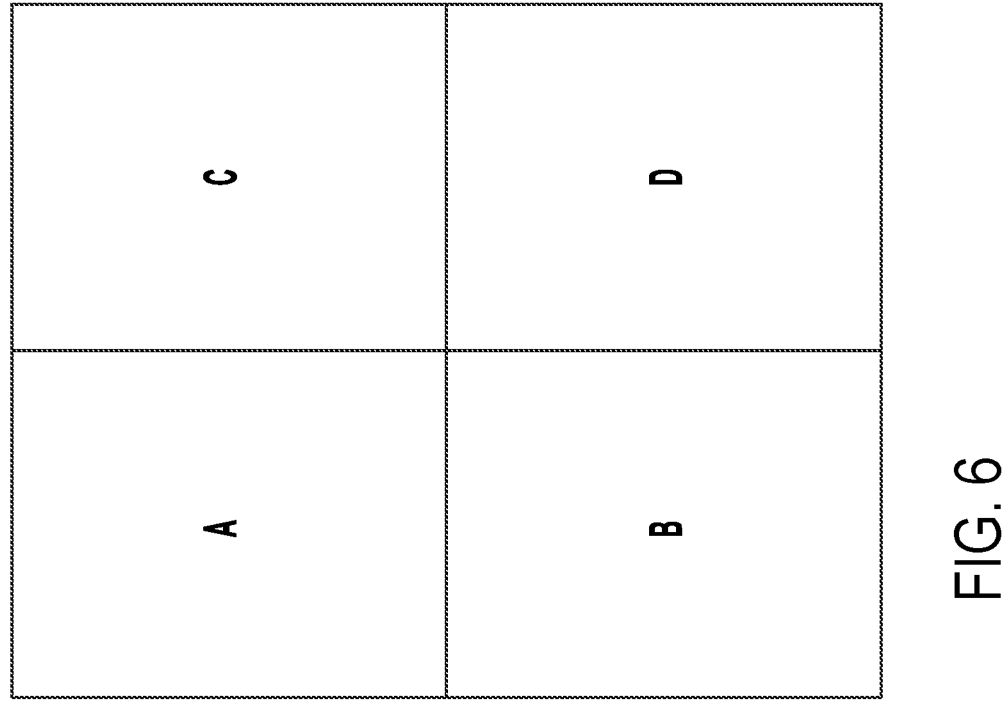
FIG. 6 illustrates an example octave CactusNet for a varying octave model.
Figure 6:
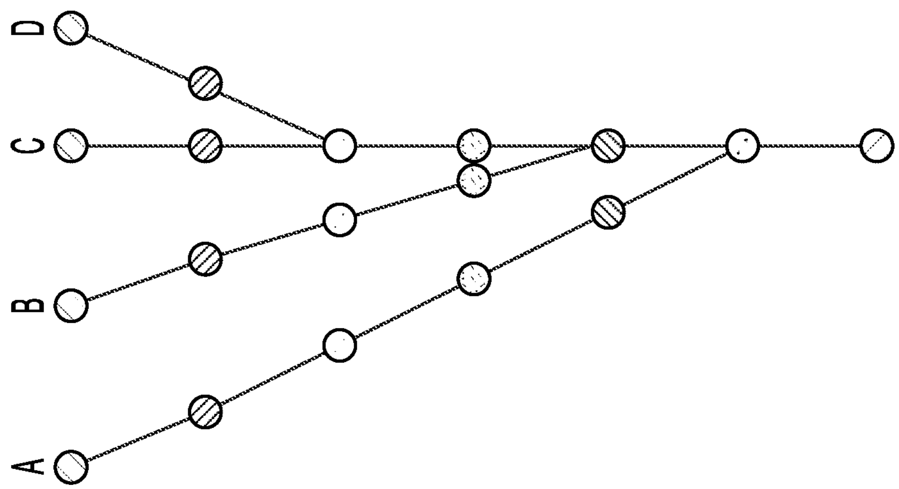

The resulting Octave CactusNets are illustrated in FIG. 5 for the constant octave model, and FIG. 6 for the varying octave model. The Octave CactusNet illustrated in FIG. 5 was trained on the MNIST dataset, and illustrates a constant octave model where the main branch, branch C, is trained on a dataset with a single consistent octave across all training images. FIG. 6, by contrast, was trained on the CIFAR10 dataset, which has varying octave across the training images. The main branch, branch D, is trained on images at many octaves. At first glance one of the differences between the two that jumps out is the number of branches between the constant and varying octave models. The constant octave CactusNet contains 6 branches where the varying octave branch does not.

This is a result of the varying octave model have learned features at many octaves already in the main branch. Resulting branches occur for octaves that were not in the training data or sparsely present in the training data.

TABLE VIII

| Branch | Test Accuracy |
|---|---|
| A | 0.331 |
| B | 0.487 |
| C | 0.995 |
| D | 0.998 |
| E | 0.997 |
| F | 0.997 |
| G | 0.996 |

Table VIII presents the test accuracy for each branch of the constant octave CactusNet. The first thing that jumps out is the low accuracy scores for branches A and B. All the classes down scaled at 0.2 and below are contained within branches A and B. Branch B also contains classes at the highest octaves as well. Images down scaled to this point may only contain a few non zero pixels which is not enough to have distinguishing features. High octaves can result in a similar effect but instead of the image containing all zeros it might contain all ones. Branch A contains images at the very lowest and least differentiable octaves, [0.01, 0, 15], and is doing little more than randomly guessing. Branch B contains some classes and octaves, like class 3 at octave 0.2, that can be differentiated but outside of those the rest of the classes and octaves cannot be differentiated. Branches with the intermediate to high octaves have accuracy greater than 0.99.

TABLE IX

| Branch | Text Accuracy |
|---|---|
| A | 0.551 |
| B | 0.993 |
| C | 0.991 |
| D | 0.994 |

In Table IX is the test accuracy for the varying octave CactusNet. This is the least branching of the two Octave CactusNets. Most of the octaves still matched to classes in the main branch. Interestingly, the main branch did not have the highest accuracy, and instead branch D did followed by branch C. This could be because the number of classes and octaves learned with in the main branch is significantly greater than branches D and C which are specialized on only a few classes and octaves. These specialized branches have a simpler task with fewer features and produce a higher test accuracy. Similar to the constant octave CactusNet there is a branch where almost all the classes at the lowest and highest octaves fall into. Images at these octaves contain almost no features, resulting in a branch that does little more than random guessing.

Generative Applicability: The following section describes the methodology for measuring and observing the applicability of GANs, with details regarding the tests and the theoretical background for set and layer applicability in discriminators. This is followed by how the system transfers weights in generators to measure applicability of generators, and how applicability to a whole GAN can be quantified and measured.

Generative Adversarial Network: There are many flavors of generative adversarial networks, but the goal in general remains the same. A Generator tries to "cheat" a discriminator whose job is to distinguish real samples drawn from a probability distribution from fake ones generated by. For the most basic GAN, this objective function is expressed as $$\min\max \mathcal{L}(,\ ) = \mathbb{E}_{x}[\log(x)] + \mathbb{E}_{\tau}[\log(1 - ((\tau)))] \tag{5}$$

with x being the ground truth drawn iid from the probability distribution to be learned and being some latent noise encoding.

It has been shown in recent work that under ideal hyperparameter tuning and with random initializers most GAN flavors can produce identical behavior. It is for this reason that the example systems described herein use some of most common styles of GAN. Systems configured as described herein can also use other GAN architectures.

Evaluating and scoring the performance of GANs has been one of the biggest problems facing researchers in this area. Fréchet Inception Distance (FID) has been shown to be a good metric for evaluating GAN performance. FID is computed by representing the layer embeddings of true and fake data as Gaussians and computing the distance between them. This is mathematically represented as:

$$\mathcal{FID}(x,^\wedge) = \|\mu_x - \mu^\wedge\|^2 + Tr\left(\sigma_x + \sigma^\wedge - 2(\sigma_x\sigma^\wedge)^{1/2}\right) \tag{6}$$

where x and ^ are the ground truth and generator distributions respectively, (σ, μ) are the means and covariance of the respective Gaussians, and Tr represents the trace. The system compares the FID scores of a GANs with varying amounts of transfer at different layers to quantify the effect class and set specific features have on adversarial training.

Input Sets: To test applicability, the system uses the three types of input sets defined for applicability testing: objective known, objective unknown, and nonobjective. Each type maintains their original definition for generative applicability. Each set applies to the entire GAN, both generator and discriminator, not just part of the system.

Discriminator Set Applicability: Set applicability is defined as a trained network's ability to apply to problems from a different set or domain. This is measured by the difference of the source domain performance of the model from the target domain performance, $$\epsilon = |\psi(d_t) - \psi(d_s)|,$$

where $d_s$ and $d_t$ respectively denote the source and the target domains, and ψ( ) denotes the objective function of the neural network.

Another way to think of applicability is a feature's ability to differentiate between $d_t$ and $d_s$. For set applicability for discriminators, the system follows a similar set up to that proposed in. The source domain and the classes created by the generative model will be defined as A and the target domain will be defined as B. The system will transfer, layer by layer, the weights from the discriminator in A onto B testing the accuracy with each transferred layer. The system can compare the ability of the discriminator of B to classify, with a baseline neural network trained on the transferred classes. The system can perform this process for each type of input set.

Discriminator Class Applicability: In this set up, the system seeks to measure how well a neural network, layer by layer, can differentiate an input class c from each individual class in the union of the objective unknown and the non-objective sets (which represents the set of all unknown classes). Let $N=\{n_0, \ldots, n_t\}$ be a neural network with layers $n_i$, $i=1, \ldots, t$. Let un be the set of unknown classes.

For each input class/unknown class pair $(x, un_j)$, where $un_j$ denotes the jth unknown class, the system freezes all the layers up to and including the desired layer it is measuring, $n_i$, for the neural network N. N is fine tuned as a binary classifier on $(x, un_j)$. This function is denoted as $$\xi_i = N((x, un_j), n_i).$$

The class applicability is then the averaged sum of ξ over all the layers which represents the average differentiability.

$$App_x(un_j) = \frac{\sum_{v=1}^{t} \xi_v}{t} \tag{7}$$

Similar to set applicability, this process can be performed on the discriminator and compared to a traditionally trained classifier measured under identical circumstances.

Generator Applicability: Apart from measuring the applicability of features in discriminators, The features learned in generators and their applicability to other tasks, such as classification. To do this, the system transfers the learned weights from a trained generator to a classifier. For decoder generators, the system inverts the generator to convert the decoder to an architecture that makes sense for classification. This allows tests that were performed on the discriminators for applicability to be used for measuring applicability in a generator. The system tests both set and class applicability of the trained generator.

Figure 7:
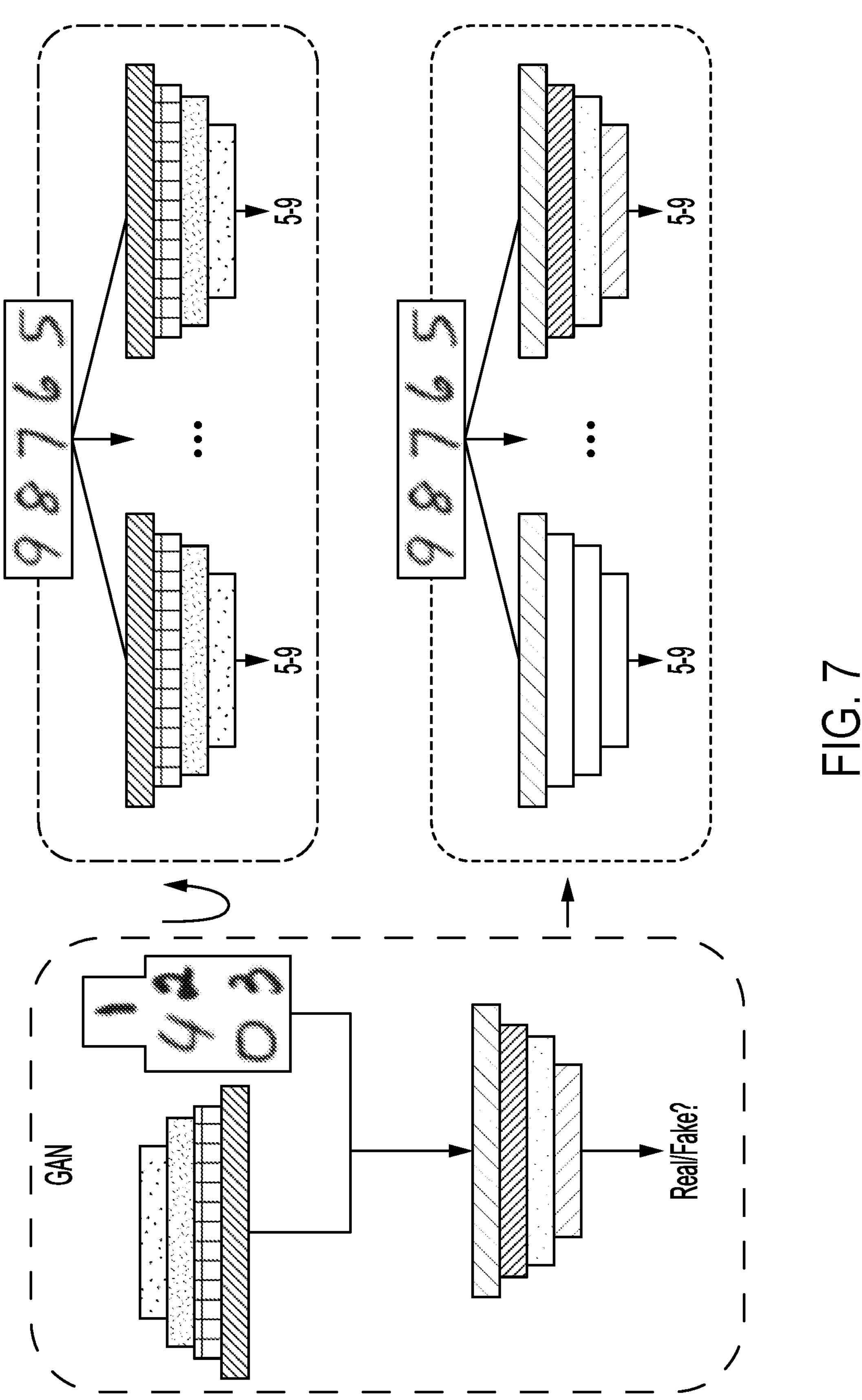
FIG. 7 illustrates an example setup for measuring applicability.

FIG. 7 gives a general scheme for testing applicability for both discriminators and generators. As shown in FIG. 7 the GAN will be trained on half the classes of a given dataset, either MNIST or CIFAR10 in this case. FIG. 7 illustrates an example setup for measuring applicability in the discriminator and the generator. The classes in the input dataset are split in half, with the GAN being trained on the first half. The generator and discriminator's weights are frozen, and the generator is flipped. Both are then used for classification on the unknown second half of the dataset. This is repeated with descending layers of the network's weights randomized and unfrozen. That is, after training, the layers will be transferred to an untrained classification network and frozen during training to ensure the network uses only the previously learned weights at those layers. Multiple classification networks are built using the GAN layers each measuring the applicability at that layer.

Transferring to the GAN: One of the more practical metrics for evaluating applicability of GAN features is the effect transfer has on the whole adversarial process. Evaluating metrics like discriminator loss and convergence time, when transferring learned features to a GAN, can provide a macro view of the effect transferring has on the GAN. More importantly, the system computes the FID of the final generator after convergence to evaluate performance from a more micro perspective. Similar to previous set ups, the system transfers the learned features to the generator and discriminator of a GAN and use that as prior knowledge for training. The transferred layers are frozen to ensure that the model is entirely reliant on those features. The objective of the GAN will be to generate samples from the training distribution using, either entirely or partially, the features transferred to it. As in other instances, the system uses the three objective sets, known objective, unknown objective, and nonobjective, to understand the applicability of the representations acquired by the GAN.

Set Applicability: Using MNIST, the system tests the set applicability for a GAN whose generator and discriminator each contain four fully connected layers with size [128, 256, 512, 1024], each with ReLU (Rectified Linear Unit) activation and batch normalization. For MNIST, the system tests both objective known and objective unknown applicability for each layer of the discriminator and generator. Each are compared with a standard classification network as the control. For objective unknown, the data is split between classes 0-4 and 5-9. The system can run multiple tests: one using 0-4 as the base with 5-9 being transferred and the other with 5-9 as the base and 0-4 being transferred.

To test the applicability for pretrained weights on a set at a layer n, all the layers before and including n are frozen during training. The unfrozen layers contain randomly initialized weights and are trained using backpropagation. The output layer indicates that all the layers except the final classification layer were frozen. The results for set applicability on the objective known set of MNIST are presented in Table X, while the objective unknown tests on both splits are presented in Table XI. The values shown in both tables are the validation accuracy for each model after convergence.

TABLE X

| | Discriminator | Generator | Control |
|---|---|---|---|
| Layer 1 | 0.980 | 0.953 | 0.989 |
| Layer 2 | 0.971 | 0.948 | 0.981 |
| Layer 3 | 0.964 | 0.941 | 0.974 |
| Output | 0.955 | 0.926 | 0.969 |

In Table X is the layer by layer set applicability scores for the objective known set of known classes from the MNIST dataset. As may be expected, the control performs best, but the scores between the discriminator and generator are of particular interest. The discriminator shows considerably greater applicability to the known set, classes the GAN was trained on, than the generator with an average applicability of 0.968, compared with the generator whose average applicability is 0.942. This would indicate that the features learned for differentiating outputs, as either real or fake, can be better applied to classification that those learned in for synthesis. The features learned for synthesis can be well applied to classification as the generator still does perform well on classification.

TABLE XI

| | Discriminator 0-4 | Generator 0-4 | Control 0-4 | Discriminator 5-9 | Generator 5-9 | Control 5-9 |
|---|---|---|---|---|---|---|
| Layer 1 | 0.971 | 0.941 | 0.982 | 0.977 | 0.943 | 0.979 |
| Layer 2 | 0.966 | 0.932 | 0.975 | 0.973 | 0.935 | 0.978 |
| Layer 3 | 0.965 | 0.939 | 0.969 | 0.980 | 0.930 | 0.971 |
| Output | 0.963 | 0.921 | 0.964 | 0.975 | 0.926 | 0.982 |

In Table XI are the layer by layer set applicability scores for objective unknown classes from the MNIST dataset, with the class range in row two indicating the base classes the frozen layers were trained on. It is seen that the trend of the results shown in Table X continues to hold true for the unknown objective set with the control performing best, followed by the discriminator, and then the generator. Classification using features from other classes performs worse, but the accuracy scores still indicate that there is a large overlap. Interestingly, overall the features learned from the classes in the 5-9 range applied better to the 0-4 classes than vice versa.

To observe feature applicability for models with more complex features the system can repeat these steps for models trained on the CIFAR10 dataset. Additionally, because there are both man made and natural classes, the system can also measure set applicability for the third set: nonobjective. The set up is almost identical to the previous MNIST test. However, while the objective/nonobjective split is between man made and natural, the objective known and unknown split is less obvious. In this case, the system can train the control and GAN on three random classes from the objective set and use the remaining for testing. The network architecture in this case is four convolutional layers with size [32, 64, 128, 256] ending with a fully connected classification layer. Results from the objective known and unknown tests are presented in Table XII (showing the layer by layer set applicability scores for objective known classes from the CIFAR10 dataset) and Table XIII (showing the layer by layer set applicability scores for objective unknown classes from the CIFAR10 dataset), while results from the nonobjective tests are shown in Table XIV (showing the layer by layer set applicability scores for nonobjective classes from the CIFAR10 dataset, where the "man-made" columns indicate that the base features in the frozen layers are from the man-made set).

TABLE XII

| | Discriminator | Generator | Control |
|---|---|---|---|
| Layer 1 | 0.782 | 0.778 | 0.790 |
| Layer 2 | 0.778 | 0.774 | 0.788 |
| Layer 3 | 0.768 | 0.765 | 0.785 |
| Layer 4 | 0.760 | 0.758 | 0.780 |
| Layer 5 | 0.754 | 0.750 | 0.776 |
| Output | 0.750 | 0.745 | 0.771 |

TABLE XIII

| | Discriminator Man-made | Generator Man-made | Control Man-made | Discriminator Natural | Generator Natural | Control Natural |
|---|---|---|---|---|---|---|
| Layer 1 | 0.777 | 0.775 | 0.788 | 0.774 | 0.772 | 0.785 |
| Layer 2 | 0.774 | 0.769 | 0.784 | 0.770 | 0.768 | 0.782 |
| Layer 3 | 0.766 | 0.763 | 0.780 | 0.763 | 0.760 | 0.777 |
| Layer 4 | 0.757 | 0.755 | 0.774 | 0.757 | 0.753 | 0.772 |
| Layer 5 | 0.75 | 0.748 | 0.776 | 0.751 | 0.744 | 0.768 |
| Output | 0.748 | 0.746 | 0.764 | 0.746 | 0.738 | 0.761 |

TABLE XIV

| | Discriminator Man-made | Generator Man-made | Control Man-made | Discriminator Natural | Generator Natural | Control Natural |
|---|---|---|---|---|---|---|
| Layer 1 | 0.756 | 0.75 | 0.767 | 0.753 | 0.749 | 0.765 |
| Layer 2 | 0.745 | 0.743 | 0.763 | 0.748 | 0.743 | 0.761 |
| Layer 3 | 0.736 | 0.733 | 0.759 | 0.740 | 0.732 | 0.756 |
| Layer 4 | 0.728 | 0.728 | 0.752 | 0.731 | 0.727 | 0.750 |
| Layer 5 | 0.72 | 0.719 | 0.744 | 0.725 | 0.719 | 0.742 |
| Output | 0.718 | 0.714 | 0.741 | 0.721 | 0.714 | 0.737 |

The trends follow a similar pattern to those for MNIST except that the applicability drop-off from layer to layer in both Table XII and Table XIV is greater and more drastic. This is most likely due to the models learning more specialized features due to the increased complexity of the data. What using the CIFAR10 data allows for is to observe the applicability of the features from two sets of classes from different objectives—man-made and natural in this case.

Table XIV shows that there is even considerably greater drop off using features from one objective to classify another. This holds true in the control and the adversarial models, but it is drastically more so in the generator. Even when layers only contain features from a different objective, the generic nature of the features in the discriminator give it flexibility. This flexibility isn't enough to bridge the gap with the traditional classifier, however. Like the control, the generator would likely have very specialized features for the domain for synthesis, but unlike the control it is the worst performer. The likely cause is that even if the generator is specialized to the specific domain and classes, the features learned for synthesis are not as applicable as those generic ones for discrimination.

Figure 8:
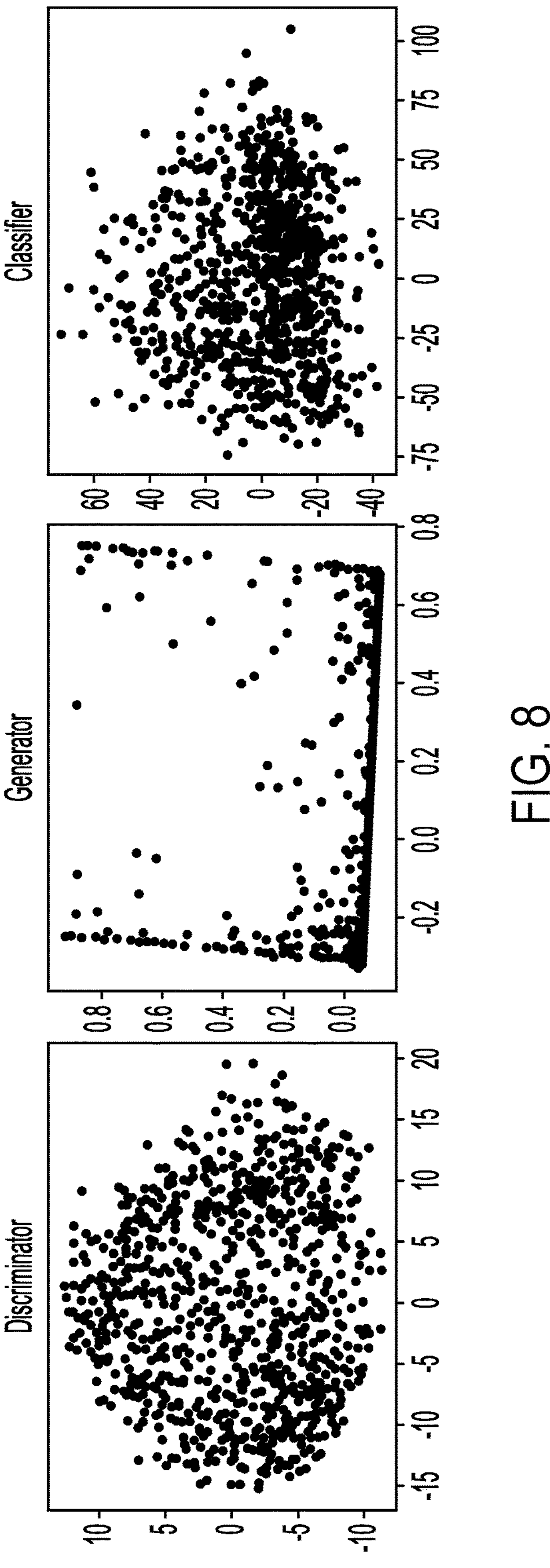
FIG. 8 illustrates example plots of activations at the final non-output layer.
Figure 9:
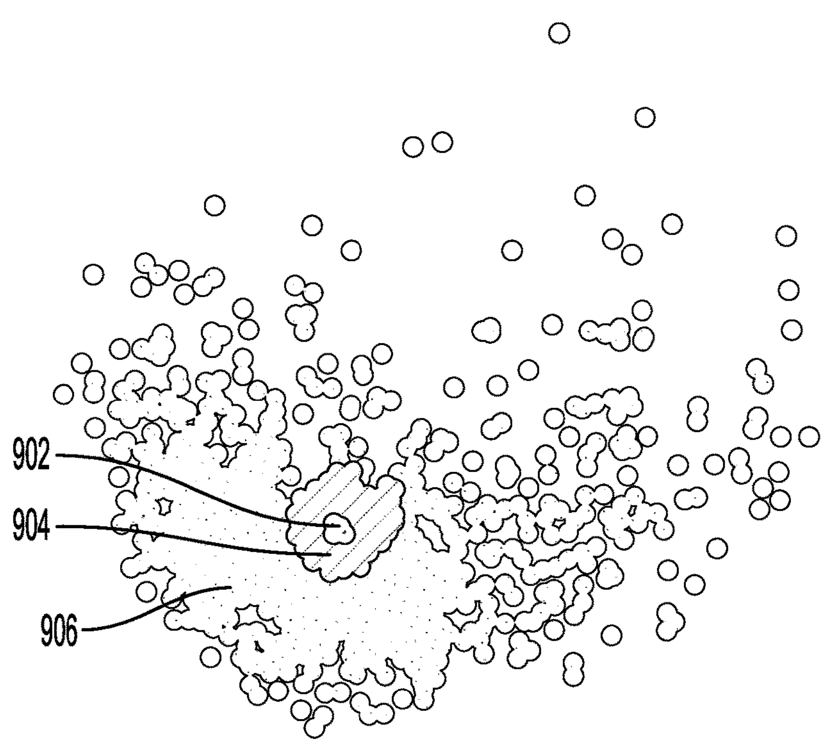
FIG. 9 illustrates example class five activations mapped for a classifier, a discriminator, and a generator.

FIG. 8 plots the activations at the final non-output layer for each model when given an unknown class, in this case class five from MNIST. As illustrated, the feature map activations are mapped into two-dimensional space for the discriminator, the generator, and the classifier. The activations for the control classifier look much more compact than those for the discriminator, while the generator activations appear to cluster towards the edges of the input image. Mapping the activations together like in FIG. 9, which illustrates class five activations mapped for classifier 902, the discriminator 904, and the generator 906, shows the scales are massively different with the classifier covering a large range and the generator being more tightly packed. The cause of this difference in scale is possibly down to the exact features learned and the types of features. The features in the classifier are specifically designed to classify, whereas those in the other two models are designed for other tasks.

Class Applicability: The setup for testing class applicability is similar to that of set applicability but instead measures how well features apply to individual classes. In this case, each class is compared to all the rest from each set.

Each test uses a model with base features trained on the objective known set. The system can train the base layers using a GAN and compare the results to a traditional classifier as the control. The system can measure the total class applicability at each layer using the equation presented in Equation 7. The distance between the known and unknown plots are relatively the same for all three models.

There is little difference between how applicable a generator and discriminator's features are to specific classes. It should be pointed out that both the generator and discriminator could easily have learned entirely different sets of features that just have the same applicability, but those sets of features have little need of being class specific.

GAN Applicability: The system can also test the impact features have to the entire adversarial process. To this end, the system can train a GAN on only the natural images of the CIFAR10 dataset. The system can then transfer both the generator and discriminator weights to a new GAN. The model is then trained on the nonobjective set, tests are run using both man-made and natural. The system can test the effects the learned features at each layer have by freezing that layer n and all the previous layers to ensure that the model is only applying the previously learned features. The system can measure the performance of the GAN by computing the FID score at the end.

TABLE XV

| | Objective Known Man-made | Objective Unknown Man-made | Non-objective Man-made | Objective Known Natural | Objective Unknown Natural | Non-objective Natural |
|---|---|---|---|---|---|---|
| Disc. 1 | 74.3 | 79.8 | 85.1 | 76.3 | 79.8 | 90.3 |
| Disc. 2 | 77.7 | 80.8 | 9.1 | 79.7 | 81.5 | 96.0 |
| Disc. 3 | 83.4 | 86.9 | 96.7 | 85.1 | 82.7 | 161.4 |
| Disc. 4 | 86.5 | 91.1 | 100.2 | 88.7 | 92.4 | 102.6 |
| Disc. 5 | 94.2 | 98.8 | 101.8 | 95.8 | 99.1 | 104.5 |
| Gan 1 | 73.3 | 77.2 | 82.5 | 74.3 | 78.6 | 85.1 |
| Gan 2 | 75.4 | 79.4 | 87.4 | 76.1 | 79.8 | 89.1 |
| Gan 3 | 80.7 | 83.2 | 92.8 | 86.4 | 84.8 | 94.8 |
| Gan 4 | 84.6 | 88.8 | 98.2 | 94.4 | 90.6 | 100.4 |
| Gan 5 | 59.9 | 92.3 | 101.9 | 90.8 | 93.1 | 103.6 |

Table XV illustrates FID scores for a GAN trained on the CIFAR10 dataset, and shows that the performance of the GAN on CIFAR10 dramatically decreases as the specificity of prior features increases. This is shown by the average FID of 99.0 and 95.3 when all the layers in the discriminator and generator, excluding the final output layer, are frozen and can only use the prior knowledge. These results go to reinforce the conclusions that even during adversarial training, when there is no consideration for input class, the generator and discriminator learn some class specific features, while exhibiting the general to specific flow that is seen in classification networks. It should be noted that if each model had its hyperparameters tuned though more rigorous hyper-parameter tuning, it could improve the FID scores.

Figure 10:
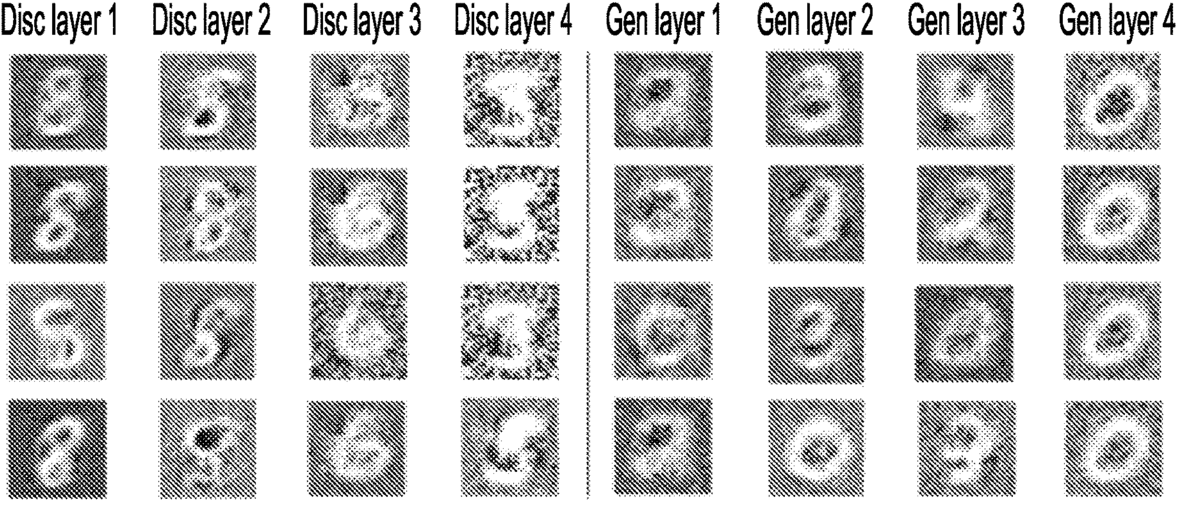
FIG. 10 illustrates example generator outputs for a GAN (Generative Adversarial Network)

Furthermore, unlike the previous tests, which measured how the features learned during the adversarial training applied to classifying specific classes, in this test the generator outperforms the discriminator. To visualize this, observe in FIG. 10 the GAN outputs for classes 5-9 when using base features from 0-4. FIG. 10 illustrates example generator outputs for a GAN with various layers trained on the 0-4 classes and transferred to a GAN being trained on 5-9. The generator will still synthesize images using its original set of features that were transferred to it. The generator only receives noise as input and the gradients represent whether or not the discriminator guessed if the image was real or fake correctly. In this scenario, because the generator already outputs images that are very close in feature space to those tested in the discriminator, the loss is small from the start. The generator then doesn't learn to generate new classes, but instead seems to converge to producing the classes that would fool the discriminator most often. Even when using nonobjective features from CIFAR10, transferring the generator weights performs better than the discriminator; though the improvement is not as great.

Generative CactusNets: The system can use the CactusNet as both the generator and discriminator, separately, to measure creating generative CactusNets. To create the generator from the trained CactusNet the system can reverse the process shown in FIG. 7. The system can transfer the trained weights from the trained convolutional CactusNet to the corresponding convolutional layers in the generators; each followed by an upsampling layer. The last two fully connected layers are not transferred over and instead replaced by a final convolutional layer that outputs the final image. An input layer is also added that takes in a latent vector. The generator is briefly trained with only the last layer unfrozen. The other layers in the CactusNet are frozen to preserve the original weights. When the CactusNet is the generator the discriminator is a standard convolutional network designed to discern real from fake.

When using the trained CactusNet as the discriminator the only modification that needs to be made is that the final layer needs to be replaced. For each branch of the CactusNet, the last fully connected layer is changed to a softmax layer with a single neuron to give the probability of real or fake. When using the trained CactusNet as the discriminator, the system can use a five layer up-convolutional network that takes in a latent vector as the generator. The CactusNet discriminator layers are frozen while training the generator to preserve the original weights.

To measure the quality of images produced by both GANs quantitatively, the system can get the total classification accuracy when using a trained convolutional neural network to classify the generated images. This is a common practice in quantitative analysis of GANs. The system can use a newly trained convolution neural network that is trained equally on all the classes the generative CactusNet learned to generate. A GAN with five convolutional layers for both the generator and discriminator in addition to the output layers is used for the control. This structure is identical to the main branch of the CactusNet and a common architecture providing a good control for the CactusNets. The control and generator in the discriminator CactusNet are both trained on an individual class, with the network being retrained for every new class.

TABLE XVI

| | Control | Generator | Discriminator |
|---|---|---|---|
| Car | 0.921 | 0.918 | 0.920 |
| 18-Wheeler | 0.935 | 0.929 | 0.937 |
| Tractor | 0.914 | 0.909 | 0.911 |
| Pickup | 0.929 | 0.925 | 0.927 |
| Airplane | 0.929 | 0.914 | 0.932 |
| Bicycle | 0.935 | 0.938 | 0.933 |
| House | 0.931 | 0.919 | 0.928 |
| Skyscrapper | 0.939 | 0.933 | 0.937 |
| Boat | 0.963 | 0.959 | 0.959 |
| Basketball | 0.941 | 0.924 | 0.938 |
| Giraffe | 0.966 | 0.961 | 0.966 |
| Bear | 0.957 | 0.952 | 0.958 |
| Cow | 0.978 | 0.966 | 0.972 |
| Dolphin | 0.949 | 0.933 | 0.941 |
| Cardinal | 0.951 | 0.948 | 0.949 |
| Stingray | 0.952 | 0.953 | 0.955 |
| Beetle | 0.958 | 0.945 | 0.955 |
| Sponge | 0.947 | 0.930 | 0.945 |
| Cactus | 0.974 | 0.971 | 0.977 |
| Flower | 0.981 | 0.978 | 0.980 |
| Non-Objective | 0.934 | 0.927 | 0.932 |
| Objective | 0.961 | 0.954 | 0.960 |
| Average | 0.948 | 0.941 | 0.946 |

Table XVI illustrates the classification accuracy of GAN created images by method, and gives the accuracy for every class that the CactusNet created in section IV-B was trained on. Both generative CactusNet types (discriminator and generator) perform well with an average accuracy above 0.95. The discriminator performs comparably well to the control, but the generator performs notably worse. The control and the discriminator CactusNet have a generator whose learned features are dedicated to and individual class and generation, while the generator CactusNet's learned features are not as specialized. Because the discriminators task is closer to classification the discriminator CactusNet is able to perform closer to the control.

Interestingly classifying generated objective (natural) images are notably more accurate than non-objective (man-made) images. This is reflected in both the generator and discriminator CactusNets, but more drastically in the generator CactusNet. This suggests that the applicability drop off between objective and non-objective, even in the CactusNet, results in diminished image quality.

Systems configured as described above can use applicability to determine transferability of features within images by using applicability in deep neural networks. The system has defined applicability, quantifies it, and can test/demonstrate the applicability connection to transferability of features. Applicability also includes image octaves, also known as "octave resonance." As part of a self-verification, the system can test the accuracy of the results by performing a first feature analysis of GANs using applicability to compare the learned features between generators and discriminators. Lastly, the inventors used applicability to create an efficient and self-growing deep neural network, called the CactusNet, that can perform unsupervised learning with efficient reuse of learned parameters. CactusNets were expanded and demonstrated on octaves, and had their effectiveness measured for GANs.

GAP— Quantifying the General Adversarial Set and Class Feature Applicability of Deep Neural Networks Systems configured as disclosed herein can also measure the applicability of GANs (Generative Adversarial Networks). During adversarial training of a GAN, the Generator G tries to "fool" a discriminator D whose job is to distinguish between real and fake samples from its probability distribution. For the most basic GAN, this objective function is:

$$\min_G \max_D L(G, D) = E_{x \sim d_x}[\log D(x)] + E_{z \sim d_z}[\log(1 - D(G(z))), \quad (8)$$

where x is the ground truth data sampled from the probability distribution $d_x$ to be learned and z is some latent noise encoding with distribution dz.

It has been shown in recent work that under ideal hyper-parameter tuning and with random initializers most GAN flavors can produce identical behavior. It is for this reason that examples focus on some of most common styles of GAN. However, the findings presented here will translate to various other GAN architectures.

Recently, the Fréchet Inception Distance (FID) has been shown to be a good metric for evaluating GAN performance. FID is computed by representing the layer embeddings of true and fake data as Gaussians and computing the distance between them. This is mathematically represented as:

$$FID(x, g) = \|\mu_x - \mu_g\|^2 + Tr\left(\sum_x + \sum_g - 2\left(\sum_x \sum_g\right)^{1/2}\right) \quad (9)$$

where $x \sim \mathcal{N}(\mu_x, \Sigma_x)$ (the Gaussian corresponding to ground truth), $g \sim \mathcal{N}(\mu_g, \Sigma_g)$ (the Gaussian corresponding to the generator), and Tr represents the trace. FID scores of a GAN with varying amounts of transfer at different layers are compared to quantify the effect class and set specific features have on adversarial training.

Input Sets: To test applicability, the system defines three types of input sets: objective known, objective unknown, and nonobjective. An objective known set is the set of classes which a neural network has been trained on. An objective unknown set is similar to an objective known set, where its classes are similar and come from the same domain, but the network is not trained on those classes. It has been shown that neural networks' features have high applicability to objective unknown sets modulo some error. Lastly, nonobjective is the remaining set of classes that the neural network has not been trained on and are not part of the same domain. To measure applicability, network performance will be examined across these three sets to cover the entire input domain.

Discriminator Set Applicability: Set applicability is defined as a trained network's ability to apply to problems from a different set or domain. This can be defined as the error between the model's performance on the source domain and that on the target domain, $$\epsilon = |\phi(d_t) - \phi(d_s)|,$$

where $d_t$ is the target domain, $d_s$ is the source domain, and $\phi(d)$ is the objective of the neural network.

Another way to think of applicability is a feature's ability to differentiate between $d_t$ and $d_s$. The source domain and the classes created by the generative model will be defined as A and the target domain will be defined as B. We will transfer, layer by layer, the weights from the discriminator in A onto B testing the accuracy with each transferred layer. The system can compare the ability of the discriminator of B to classify, with a baseline neural network trained on the transferred classes. The system can perform this for each type of input set.

Discriminator Class Applicability: Apart from observing how well the features from a learned discriminator apply to different domains, how the layers within a discriminator learn features and how applicable those features can be to individual classes is considered. It is important to observe what types of features the discriminator learns class by class during the adversarial process and how they differ from a traditional classification model.

The system defines class applicability similar to. This set up seeks to measure how well a neural network, layer by layer, can differentiate an input class c from each individual class in the union of the objective unknown and the nonobjective sets (which represents the set of all unknown classes). Let $N=\{n_0, \ldots, n_t\}$ be a neural network with layers $n_i$, $i=1, \ldots, t$. Let un be the set of unknown classes. For each input class/unknown class pair, denoted by $(x, un_j)$, where $un_j$ denotes the jth unknown class, all the layers up to and including the desired layer being measured, labeled as $n_i$, for the neural network N. N is fine tuned as a binary classifier on $(x, un_j)$. This function is denoted $$\xi_i^j = N((x, un_j), n_i).$$

The class applicability is then the averaged sum of $\xi$ over all the layers which represents the average differentiability.

$$App_x(un_j) = \frac{\sum_{v=1}^{t} \xi_v^j}{t} \tag{10}$$

Similar to set applicability, this can be performed on the discriminator and compared to a traditionally trained classifier measured under identical circumstances.

Generator Applicability: Apart from measuring the applicability of features in discriminators, the features learned in generators and their applicability to other tasks, such as classification are observed. To do this, the learned weights are transferred from a trained generator to a classifier. For decoder generators, the generator is inverted to convert the decoder to an architecture that makes sense for classification. This allows tests that were performed on the discriminators for applicability to be used for measuring applicability in a generator. Both set and class applicability of the trained generator are tested.

In this approach, the GAN will be trained on half the classes of a given dataset, either MNIST or CIFAR10 in this case. After training, the layers will be transferred to an untrained classification network and frozen during training to ensure the network uses only the previously learned weights at those layers. Multiple classification networks are built using the GAN layers each measuring the applicability at that layer. For MNIST, GANs follow the architecture proposed in and for CIFAR10.

Transferring to the GAN: One of the more practical metrics for evaluating applicability of GAN features is the effect transfer has on the whole adversarial process. Evaluating metrics like discriminator loss and convergence time, when transferring learned features to a GAN, can provide a macro view of the effect transferring has on the GAN. The FID of the final generator is computed after convergence to evaluate performance from a more micro perspective. Similar to previous set ups, the learned features are transferred to the generator and the discriminator of a GAN and use that as prior knowledge for training. The transferred layers are frozen to ensure that the model is entirely reliant on those features. The objective of the GAN will be to generate samples from the training distribution using, either entirely or partially, the features transferred to it. As in other examples, the system can use the three objective sets (known objective, unknown objective, and nonobjective) to evaluate the applicability of the features learned in the GAN.

The generator will still synthesize images using its original set of features that were transferred to it. The generator only receives noise as input and the gradients represent whether or not the discriminator guessed if the image was real or fake correctly. In this scenario, because the generator already outputs images that are very close in feature space to those tested in the discriminator, the loss is small from the start. The generator then doesn't learn to generate new classes, but instead seems to converge to producing the classes that would fool the discriminator most often. Even when using nonobjective features from CIFAR10, transferring the generator weights performs better than the discriminator; though the improvement is not as great.

Systems configured as described herein can evaluate feature applicability and transferability in generative adversarial networks. The system can deploy both a discriminator and a generator, which together can be applicable to classification tasks on datasets both similar and different compared to the ones they were trained on. Additionally, the system can use the Frechet Inception Distance (FID) as a metric for measuring the applicability of features to the adversarial process in both the generator and discriminator, where the generator will tend towards using the transferred features to minimize the loss early in training.

Figure 11:
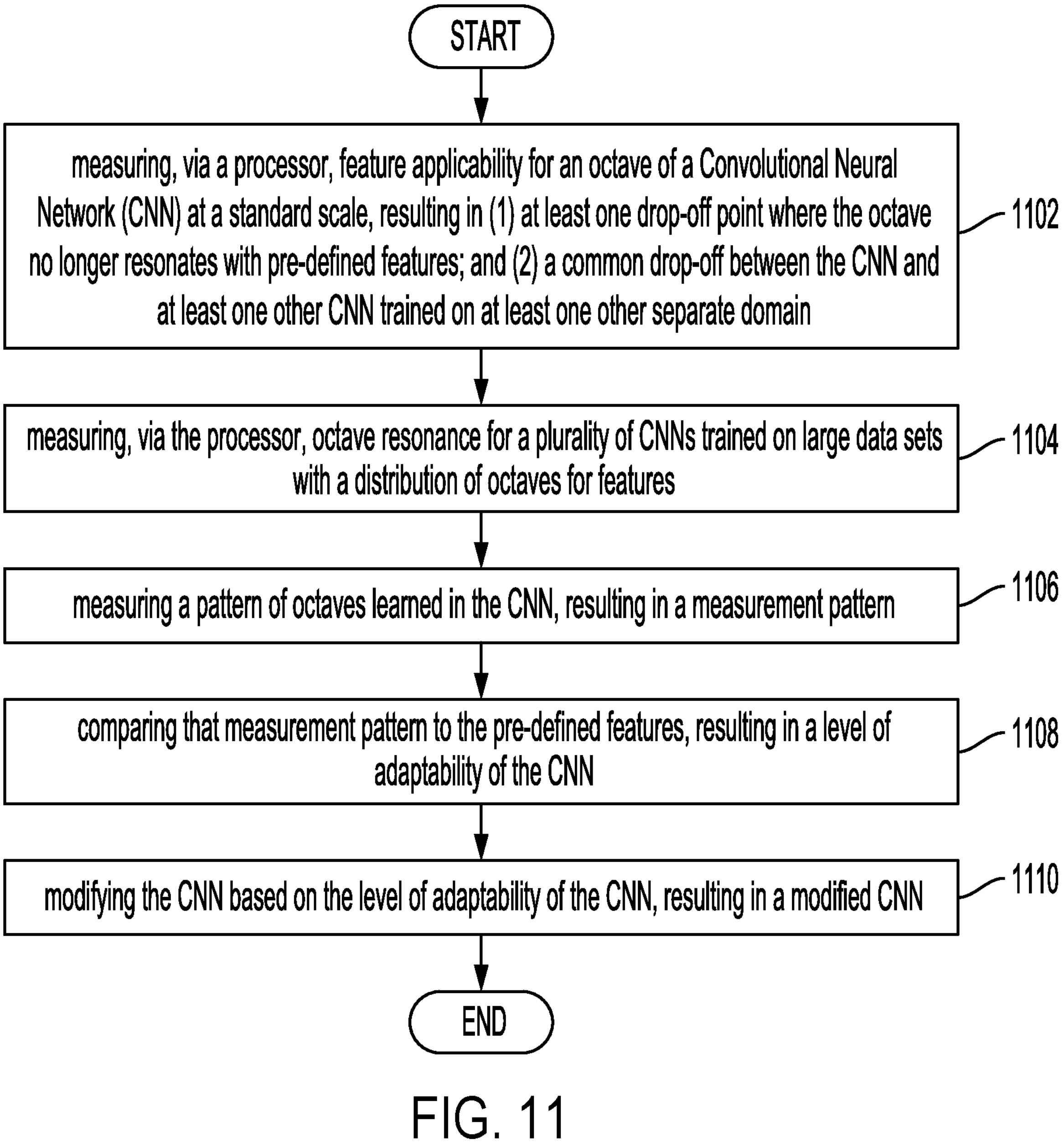
FIG. 11 illustrates an example method embodiment.

FIG. 11 illustrates an exemplary method embodiment which can be performed by a system, such as a computer system. As illustrated, the system can measure, via a processor, feature applicability for an octave of a Convolutional Neural Network (CNN) at a standard scale, resulting in (1) at least one drop-off point where the octave no longer resonates with pre-defined features; and (2) a common drop-off between the CNN and at least one other CNN trained on at least one other separate domain (1102). The system can measure, via the processor, octave resonance for a plurality of CNNs trained on large data sets with a distribution of octaves for features (1104) and measure a pattern of octaves learned in the CNN, resulting in a measurement pattern (1106). The system can also compare that measurement pattern to the pre-defined features, resulting in a level of adaptability of the CNN (1108) and modify the CNN based on the level of adaptability of the CNN, resulting in a modified CNN (1110).

In some configurations, the octave resonance results in only partial overage of the at least one other CNN by the CNN.

In some configurations, the modifying of the CNN further comprises: identifying, via the processor, at least one layer of the CNN corresponding to the at least one drop-off point; identifying, via the processor within a database of neural network layers, at least one replacement layer associated which resonates with the pre-defined features; and replacing, via the processor, the at least one layer of the CNN with the at least one replacement layer, resulting in the modified CNN. In such configurations, the pre-defined features can be associated with recognition of a particular type of object having a pre-defined scale, and the replacement layer is associated with a distinct pre-defined scale.

In some configurations, the measuring of feature applicability uses three types of inputs sets: an objective known set, an objective unknown set, and a nonobjective set.

In some configurations, the illustrated method can further include: measuring, via the processor, applicability of a new image with the modified CNN; determining, via the processor based on the applicability meeting a predefined threshold, that the new image represents a new category, resulting in a determination; generating, based on the determination, a new branch of features associated with the new image; and adding the new branch of features to the modified CNN, resulting in an updated, modified CNN. In such configurations, the method may also include performing additional image recognition using the updated, modified CNN.

Computer Figure

Figure 12:
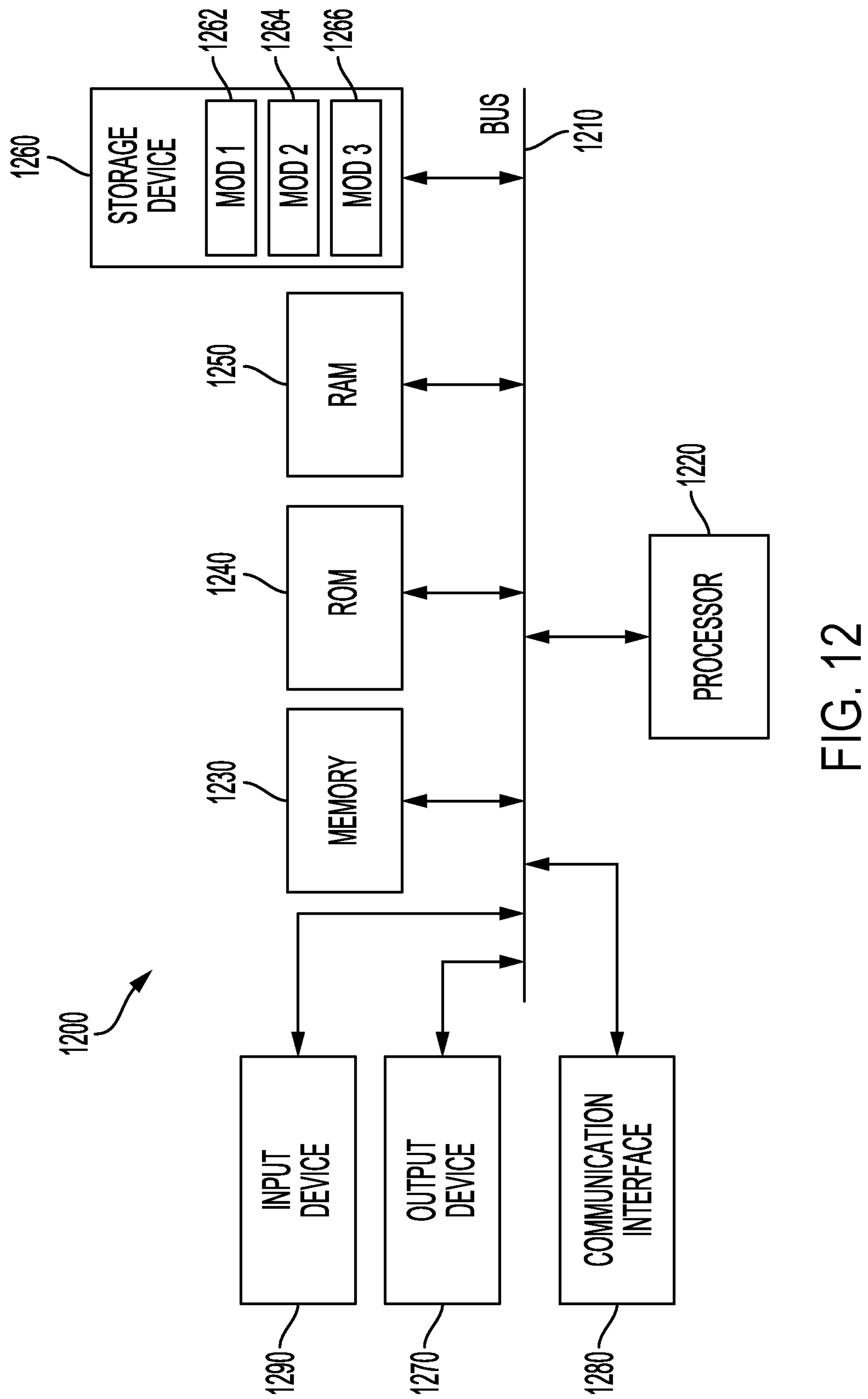
FIG. 12 illustrates an example computer system.

With reference to FIG. 12, an exemplary system includes a general-purpose computing device 1200, including a processing unit (CPU or processor) 1220 and a system bus 1210 that couples various system components including the system memory 1230 such as read-only memory (ROM) 1240 and random access memory (RAM) 1250 to the processor 1220. The system 1200 can include a cache of high-speed memory connected directly with, in close proximity to, or integrated as part of the processor 1220. The system 1200 copies data from the memory 1230 and/or the storage device 1260 to the cache for quick access by the processor 1220. In this way, the cache provides a performance boost that avoids processor 1220 delays while waiting for data. These and other modules can control or be configured to control the processor 1220 to perform various actions. Other system memory 1230 may be available for use as well. The memory 1230 can include multiple different types of memory with different performance characteristics. It can be appreciated that the disclosure may operate on a computing device 1200 with more than one processor 1220 or on a group or cluster of computing devices networked together to provide greater processing capability. The processor 1220 can include any general purpose processor and a hardware module or software module, such as module 1 1262, module 2 1264, and module 3 1266 stored in storage device 1260, configured to control the processor 1220 as well as a special-purpose processor where software instructions are incorporated into the actual processor design. The processor 1220 may essentially be a completely self-contained computing system, containing multiple cores or processors, a bus, memory controller, cache, etc. A multi-core processor may be symmetric or asymmetric.

The system bus 1210 may be any of several types of bus structures including a memory bus or memory controller, a peripheral bus, and a local bus using any of a variety of bus architectures. A basic input/output (BIOS) stored in ROM 1240 or the like, may provide the basic routine that helps to transfer information between elements within the computing device 1200, such as during start-up. The computing device 1200 further includes storage devices 1260 such as a hard disk drive, a magnetic disk drive, an optical disk drive, tape drive or the like. The storage device 1260 can include software modules 1262, 1264, 1266 for controlling the processor 1220. Other hardware or software modules are contemplated. The storage device 1260 is connected to the system bus 1210 by a drive interface. The drives and the associated computer-readable storage media provide nonvolatile storage of computer-readable instructions, data structures, program modules and other data for the computing device 1200. In one aspect, a hardware module that performs a particular function includes the software component stored in a tangible computer-readable storage medium in connection with the necessary hardware components, such as the processor 1220, bus 1210, display 1270, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 1200 is a small, handheld computing device, a desktop computer, or a computer server.

Although the exemplary embodiment described herein employs the hard disk 1260, other types of computer-readable media which can store data that are accessible by a computer, such as magnetic cassettes, flash memory cards, digital versatile disks, cartridges, random access memories (RAMs) 1250, and read-only memory (ROM) 1240, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 1200, an input device 1290 represents any number of input mechanisms, such as a microphone for speech, a touch-sensitive screen for gesture or graphical input, keyboard, mouse, motion input, speech and so forth. An output device 1270 can also be one or more of a number of output mechanisms known to those of skill in the art. In some instances, multimodal systems enable a user to provide multiple types of input to communicate with the computing device 1200. The communications interface 1280 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:

measuring, via a processor, feature applicability for an octave of a Convolutional Neural Network (CNN) at a standard scale, resulting in (1) at least one drop-off point where the octave no longer resonates with pre-defined features; and (2) a common drop-off between the CNN and at least one other CNN trained on at least one other separate domain;

measuring, via the processor, octave resonance for a plurality of CNNs trained on large data sets with a distribution of octaves for features;

measuring a pattern of octaves learned in the CNN, resulting in a measurement pattern;

comparing that measurement pattern to the pre-defined features, resulting in a level of adaptability of the CNN; and modifying the CNN based on the level of adaptability of the CNN, resulting in a modified CNN, wherein the modifying of the CNN further comprises:

identifying, via the processor, at least one layer of the CNN corresponding to the at least one drop-off point;

identifying, via the processor within a database of neural network layers, at least one replacement layer associated which resonates with the pre-defined features; and replacing, via the processor, the at least one layer of the CNN with the at least one replacement layer, resulting in the modified CNN.

2. The method of claim 1, wherein the octave resonance results in only partial overage of the at least one other CNN by the CNN.

3. The method of claim 1, wherein the pre-defined features are associated with recognition of a particular type of object having a pre-defined scale, and the replacement layer is associated with a distinct pre-defined scale.

4. The method of claim 1, wherein the measuring of feature applicability uses three types of inputs sets: an objective known set, an objective unknown set, and a nonobjective set.

5. A system comprising:

a processor; and a non-transitory computer-readable storage medium having instructions stored which, when executed by the processor, cause the processor to perform operations comprising:

measuring feature applicability for an octave of a Convolutional Neural Network (CNN) at a standard scale, resulting in (1) at least one drop-off point where the octave no longer resonates with pre-defined features; and (2) a common drop-off between the CNN and at least one other CNN trained on at least one other separate domain;

measuring octave resonance for a plurality of CNNs trained on large data sets with a distribution of octaves for features;

measuring a pattern of octaves learned in the CNN, resulting in a measurement pattern;

comparing that measurement pattern to the pre-defined features, resulting in a level of adaptability of the CNN; and modifying the CNN based on the level of adaptability of the CNN, resulting in a modified CNN, wherein the modifying of the CNN further comprises:

identifying at least one layer of the CNN corresponding to the at least one drop-off point;

identifying, within a database of neural network layers, at least one replacement layer associated which resonates with the pre-defined features; and replacing the at least one layer of the CNN with the at least one replacement layer, resulting in the modified CNN.

6. The system of claim 5, wherein the octave resonance results in only partial overage of the at least one other CNN by the CNN.

7. The system of claim 5, wherein the pre-defined features are associated with recognition of a particular type of object having a pre-defined scale, and the replacement layer is associated with a distinct pre-defined scale.

8. The system of claim 5, wherein the measuring of feature applicability uses three types of inputs sets: an objective known set, an objective unknown set, and a nonobjective set.

9. A non-transitory computer-readable storage medium having instructions stored which, when executed by a computer system, cause the computer system to perform operations comprising:

measuring feature applicability for an octave of a Convolutional Neural Network (CNN) at a standard scale, resulting in (1) at least one drop-off point where the octave no longer resonates with pre-defined features; and (2) a common drop-off between the CNN and at least one other CNN trained on at least one other separate domain;

measuring octave resonance for a plurality of CNNs trained on large data sets with a distribution of octaves for features;

measuring a pattern of octaves learned in the CNN, resulting in a measurement pattern;

comparing that measurement pattern to the pre-defined features, resulting in a level of adaptability of the CNN; and modifying the CNN based on the level of adaptability of the CNN, resulting in a modified CNN, wherein the modifying of the CNN further comprises:

identifying at least one layer of the CNN corresponding to the at least one drop-off point;

identifying, within a database of neural network layers, at least one replacement layer associated which resonates with the pre-defined features; and replacing the at least one layer of the CNN with the at least one replacement layer, resulting in the modified CNN.

10. The non-transitory computer-readable storage medium of claim 9, wherein the octave resonance results in only partial overage of the at least one other CNN by the CNN.

11. The non-transitory computer-readable storage medium of claim 9, wherein the pre-defined features are associated with recognition of a particular type of object having a pre-defined scale, and the replacement layer is associated with a distinct pre-defined scale.

12. The non-transitory computer-readable storage medium of claim 9, wherein the measuring of feature applicability uses three types of inputs sets: an objective known set, an objective unknown set, and a nonobjective set.

13. A method comprising:

measuring, via a processor, feature applicability for an octave of a Convolutional Neural Network (CNN) at a standard scale, resulting in (1) at least one drop-off point where the octave no longer resonates with pre-defined features; and (2) a common drop-off between the CNN and at least one other CNN trained on at least one other separate domain;

measuring, via the processor, octave resonance for a plurality of CNNs trained on large data sets with a distribution of octaves for features;

measuring a pattern of octaves learned in the CNN, resulting in a measurement pattern;

comparing that measurement pattern to the pre-defined features, resulting in a level of adaptability of the CNN;

modifying the CNN based on the level of adaptability of the CNN, resulting in a modified CNN;

measuring, via the processor, applicability of a new image with the modified CNN;

determining, via the processor based on the applicability meeting a predefined threshold, that the new image represents a new category, resulting in a determination;

generating, based on the determination, a new branch of features associated with the new image; and adding the new branch of features to the modified CNN, resulting in an updated, modified CNN.

14. The method of claim 13, further comprising:

performing additional image recognition using the updated, modified CNN.

15. A system comprising:

a processor; and a non-transitory computer-readable storage medium having instructions stored which, when executed by the processor, cause the processor to perform operations comprising:

measuring feature applicability for an octave of a Convolutional Neural Network (CNN) at a standard scale, resulting in (1) at least one drop-off point where the octave no longer resonates with pre-defined features; and (2) a common drop-off between the CNN and at least one other CNN trained on at least one other separate domain;

measuring octave resonance for a plurality of CNNs trained on large data sets with a distribution of octaves for features;

measuring a pattern of octaves learned in the CNN, resulting in a measurement pattern;

comparing that measurement pattern to the pre-defined features, resulting in a level of adaptability of the CNN;

modifying the CNN based on the level of adaptability of the CNN, resulting in a modified CNN;

measuring applicability of a new image with the modified CNN;

determining, based on the applicability meeting a pre-defined threshold, that the new image represents a new category, resulting in a determination;

generating, based on the determination, a new branch of features associated with the new image; and adding the new branch of features to the modified CNN, resulting in an updated, modified CNN.

16. The system of claim 15, the non-transitory computer-readable storage medium having additional instructions stored which, when executed by the processor, cause the processor to perform operations comprising:

performing additional image recognition using the updated, modified CNN.

17. A non-transitory computer-readable storage medium having instructions stored which, when executed by a computer system, cause the computer system to perform operations comprising:

measuring feature applicability for an octave of a Convolutional Neural Network (CNN) at a standard scale, resulting in (1) at least one drop-off point where the octave no longer resonates with pre-defined features; and (2) a common drop-off between the CNN and at least one other CNN trained on at least one other separate domain;

measuring octave resonance for a plurality of CNNs trained on large data sets with a distribution of octaves for features;

measuring a pattern of octaves learned in the CNN, resulting in a measurement pattern;

comparing that measurement pattern to the pre-defined features, resulting in a level of adaptability of the CNN;

modifying the CNN based on the level of adaptability of the CNN, resulting in a modified CNN;

measuring applicability of a new image with the modified CNN;

determining, based on the applicability meeting a pre-defined threshold, that the new image represents a new category, resulting in a determination;

generating, based on the determination, a new branch of features associated with the new image; and adding the new branch of features to the modified CNN, resulting in an updated, modified CNN.

* * * * *